United States Patent
Park et al.

(10) Patent No.: US 10,454,536 B2
(45) Date of Patent: Oct. 22, 2019

(54) METHOD FOR TRANSCEIVING BROADCAST SIGNAL USING COMBINATION OF MULTIPLE ANTENNA SCHEMES WITH LAYERED DIVISION MULTIPLEXING AND APPARATUS FOR THE SAME

(71) Applicant: Electronics and Telecommunications Research Institute, Daejeon (KR)

(72) Inventors: Sung-Ik Park, Daejeon (KR); Bo-Mi Lim, Daejeon (KR); Sun-Hyoung Kwon, Daejeon (KR); Heung-Mook Kim, Daejeon (KR); Jae-Hyun Seo, Daejeon (KR); Jae-Young Lee, Daejeon (KR); Nam-Ho Hur, Sejong-si (KR); Hoi-Yoon Jung, Daejeon (KR); David Gomez-Barquero, Cartagena (ES); Eduardo Garro, Alboraya (ES)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 15/993,023

(22) Filed: May 30, 2018

(65) Prior Publication Data

US 2018/0351609 A1    Dec. 6, 2018

(30) Foreign Application Priority Data

Jun. 2, 2017 (KR) .................. 10-2017-0069071
Jun. 5, 2017 (KR) .................. 10-2017-0069591
(Continued)

(51) Int. Cl.
*H04L 1/02* (2006.01)
*H04B 7/0413* (2017.01)
(Continued)

(52) U.S. Cl.
CPC ............ *H04B 7/0413* (2013.01); *H04L 1/00* (2013.01); *H04L 1/0668* (2013.01); *H04L 25/0204* (2013.01)

(58) Field of Classification Search
CPC ...... H04L 1/107; H04L 1/0618; H04J 11/004; H04J 11/00; H04B 7/0413; H03M 13/2792; H04N 3/28; H04N 21/326
(Continued)

(56) References Cited

U.S. PATENT DOCUMENTS

2016/0277150 A1* 9/2016 Baek ................. H03M 13/2792
2017/0019207 A1    1/2017 Park et al.
(Continued)

FOREIGN PATENT DOCUMENTS

KR   10-2016-0084832 A    7/2016
KR   10-2017-0009737 A    1/2017

*Primary Examiner* — Khai Tran
(74) *Attorney, Agent, or Firm* — NSIP Law

(57) ABSTRACT

Disclosed herein are a method for transceiving a broadcast signal using a combination of multiple antenna schemes with layered division multiplexing and an apparatus for the method. A method for receiving a broadcast signal includes generating received signals based on signals that are received through multiple receiving antennas, estimating channels between the receiving antennas and transmitting antennas, restoring a core-layer signal corresponding to the received signals, and restoring an enhanced-layer signal based on a cancellation process, wherein the cancellation process corresponds to the core-layer signal and is separately performed for the individual receiving antennas.

17 Claims, 26 Drawing Sheets

(30) Foreign Application Priority Data

May 24, 2018 (KR) .......................... 10-2018-0059174
May 24, 2018 (KR) .......................... 10-2018-0059198

(51) Int. Cl.
*H04L 25/02* (2006.01)
*H04L 1/00* (2006.01)
*H04L 1/06* (2006.01)

(58) Field of Classification Search
USPC ........................................ 375/267, 260, 340
See application file for complete search history.

(56) References Cited

U.S. PATENT DOCUMENTS

2017/0272692 A1* 9/2017 Lee ...................... H04N 19/187
2018/0091835 A1   3/2018 Kwak et al.
2018/0254855 A1* 9/2018 Shin ................... H04L 27/2649

* cited by examiner

METHOD FOR TRANSCEIVING BROADCAST SIGNAL USING COMBINATION OF MULTIPLE ANTENNA SCHEMES WITH LAYERED DIVISION MULTIPLEXING AND APPARATUS FOR THE SAME

CROSS REFERENCE TO RELATED APPLICATIONS

This application claims the benefit of Korean Patent Application Nos. 10-2017-0069071, filed Jun. 2, 2017, 10-2017-0069591, filed Jun. 5, 2017, 10-2018-0059174, filed May 24, 2018, and 10-2018-0059198, filed May 24, 2018, which are hereby incorporated by reference in their entirety into this application.

BACKGROUND OF THE INVENTION

1. Technical Field

The present invention relates generally to broadcast signal transceiving technology, and more particularly, to broadcast signal transceiving technology to which Layered Division Multiplexing is applied.

2. Description of the Related Art

In terrestrial broadcasting, a Single Frequency Network (SFN) has emerged as an alternative to traditional Multiple Frequency Network (MFN) modes. Through the SFN, multiple transmitters simultaneously transmit signals through the same Radio Frequency (RF) channel.

The SFN provides not only a homogeneous distribution of received signal strengths over a coverage area, but also extended-coverage spectral efficiency. However, some areas may suffer signal degradation. The amplitudes of Digital Terrestrial Television (DTT) echoes, which reach a receiver with different phases despite having similar signal magnitudes, cause serious multipath conditions creating destructive interference.

In order to prevent such undesired situations, new features, such as a Multiple-Input Single-Output (MISO) scheme, have been applied to new DTT generation.

MISO denotes a radio link which uses at least two transmitters and one receiver. A conventional topology composed of one transmitter and one receiver is referred to as a Single-Input Single-Output (SISO) scheme. MISO improves the robustness of terrestrial transmission using the spatial diversity of multiple antennas. Moreover, when at least two antennas are provided in a single receiver or when two receivers collaborate with each other (e.g. Multiple-Input Multiple-Output (MIMO) antenna scheme), spatial multiplexing gain may be obtained.

In order to simultaneously support various multiple services, multiplexing, which is a procedure for combining multiple signals, is required. Among these multiple techniques, Layered Division Multiplexing (LDM) technology for combining signals in two layers by differently setting the powers of respective layer signals has been introduced. LDM has been applied to next-generation broadcasting service, such as that of Advanced Television Systems Committee (ATSC) 3.0, by providing flexibility and performance better than those of Time Division Multiplexing (TDM) and Frequency Division Multiplexing (FDM), and application fields thereof have gradually increased and diversified.

Therefore, there is urgently required the development of a new broadcast signal transceiving technique in which LDM is combined with MISO or MIMO.

SUMMARY OF THE INVENTION

Accordingly, the present invention has been made keeping in mind the above problems occurring in the prior art, and an object of the present invention is to provide a broadcast signal transceiving technique in which multiple antenna schemes are combined with Layered Division Multiplexing.

Another object of the present invention is to efficiently combine multiple antenna schemes with Layered Division Multiplexing even when an Alamouti encoding technique, as well as a Transmit Diversity Code Filter Set (TDCFS) technique, is used.

A further object of the present invention is to efficiently transceive broadcast signals without increasing the complexity of a receiver even when there are three or more antennas, by utilizing a combination of a TDCFS scheme with an Alamouti encoding scheme when the Alamouti encoding scheme is applied as a MISO scheme.

Yet another object of the present invention is to optimize the performance of a transceiver by suitably performing Layered Division Multiplexing/demultiplexing when spatial multiplexing gain is exploited for an enhanced layer.

In accordance with an aspect of the present invention to accomplish the above objects, there is provided an apparatus for transmitting a broadcast signal, including an enhanced layer Bit-Interleaved Coded Modulation (BICM) unit for generating a first enhanced-layer signal and a second enhanced-layer signal by dividing an enhanced-layer data stream into two different enhanced layer sub-streams and by performing Multiple-Input Multiple-Output (MIMO) precoding corresponding to the enhanced layer sub-streams; a first combiner for generating a first multiplexed signal corresponding to a first antenna by combining a first core-layer signal corresponding to a core-layer data stream with the first enhanced-layer signal at different power levels; a second combiner for generating a second multiplexed signal corresponding to a second antenna by combining a second core-layer signal corresponding to the core-layer data stream with the second enhanced-layer signal at different power levels; and Radio Frequency (RF) signal generation units for generating a first RF transmission signal and a second RF transmission signal, wherein the first RF transmission signal corresponds to the first multiplexed signal and is to be transmitted through the first antenna, and the second RF transmission signal corresponds to the second multiplexed signal and is to be transmitted through the second antenna.

The first RF transmission signal and the second RF transmission signal may be generated based on transmitting antenna processing corresponding to the first antenna and the second antenna.

The transmitting antenna processing may be predistortion processing using a Transmit Diversity Code Filter Set (TDCFS).

The transmitting antenna processing may be performed after a pilot pattern has been injected into a frequency-interleaved signal.

The transmitting antenna processing may include Alamouti encoding for maintaining orthogonality between a signal corresponding to the first antenna and a signal corresponding to the second antenna.

The transmitting antenna processing may be configured to inject pilot patterns into an Alamouti-encoded signal.

The first core-layer signal and the second core-layer signal may be generated by dividing the core-layer data stream into two different core layer sub-streams and by performing MIMO precoding corresponding to the core layer sub-streams.

In accordance with another aspect of the present invention to accomplish the above objects, there is provided an apparatus for receiving a broadcast signal, including Radio Frequency (RF) reception units for generating received signals based on signals that are received through multiple receiving antennas; channel estimation units for estimating channels between the receiving antennas and transmitting antennas; a core layer Bit-Interleaved Coded Modulation (BICM) decoder for restoring a core-layer signal corresponding to the received signals; and an enhanced layer decoder for restoring an enhanced-layer signal based on a cancellation process, wherein the cancellation process corresponds to the core-layer signal and is separately performed for the individual receiving antennas.

The cancellation process may be configured to generate a first cancellation signal by subtracting a first core layer-channel component combination corresponding to channels that are related to a first receiving antenna, among the receiving antennas, from a first buffered signal corresponding to the first receiving antenna, generate a second cancellation signal by subtracting a second core layer-channel component combination corresponding to channels that are related to a second receiving antenna, among the receiving antennas, from a second buffered signal corresponding to the second receiving antenna, and restore the enhanced-layer signal using both the first cancellation signal and the second cancellation signal.

The enhanced-layer signal may be restored using MIMO decoding corresponding to the first cancellation signal and the second cancellation signal.

The core-layer signal may be restored based on Maximum-Ratio Combining (MRC) corresponding to the channels.

The cancellation process may be performed based on Alamouti re-encoding corresponding to the core-layer signal, and may be configured to restore the enhanced-layer signal using Alamouti decoding corresponding to the first cancellation signal and the second cancellation signal.

The Alamouti re-encoding may be performed after interleaving, and deinterleaving may be performed after the Alamouti decoding.

The cancellation process may be performed based on MIMO precoding corresponding to the core-layer signal.

In accordance with a further aspect of the present invention to accomplish the above objects, there is provided a method for receiving a broadcast signal, including generating received signals based on signals that are received through multiple receiving antennas; estimating channels between the receiving antennas and transmitting antennas; restoring a core-layer signal corresponding to the received signals; and restoring an enhanced-layer signal based on a cancellation process, wherein the cancellation process corresponds to the core-layer signal and is separately performed for the individual receiving antennas.

The cancellation process may be configured to generate a first cancellation signal by subtracting a first core layer-channel component combination corresponding to channels that are related to a first receiving antenna, among the receiving antennas, from a first buffered signal corresponding to the first receiving antenna, generate a second cancellation signal by subtracting a second core layer-channel component combination corresponding to channels that are related to a second receiving antenna, among the receiving antennas, from a second buffered signal corresponding to the second receiving antenna, and restore the enhanced-layer signal using both the first cancellation signal and the second cancellation signal.

The enhanced-layer signal may be restored using MIMO decoding corresponding to the first cancellation signal and the second cancellation signal.

The core-layer signal may be restored based on Maximum-Ratio Combining (MRC) corresponding to the channels.

The cancellation process may be performed based on Alamouti re-encoding corresponding to the core-layer signal, and may be configured to restore the enhanced-layer signal using Alamouti decoding corresponding to the first cancellation signal and the second cancellation signal.

The Alamouti re-encoding may be performed after interleaving, and deinterleaving may be performed after the Alamouti decoding.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
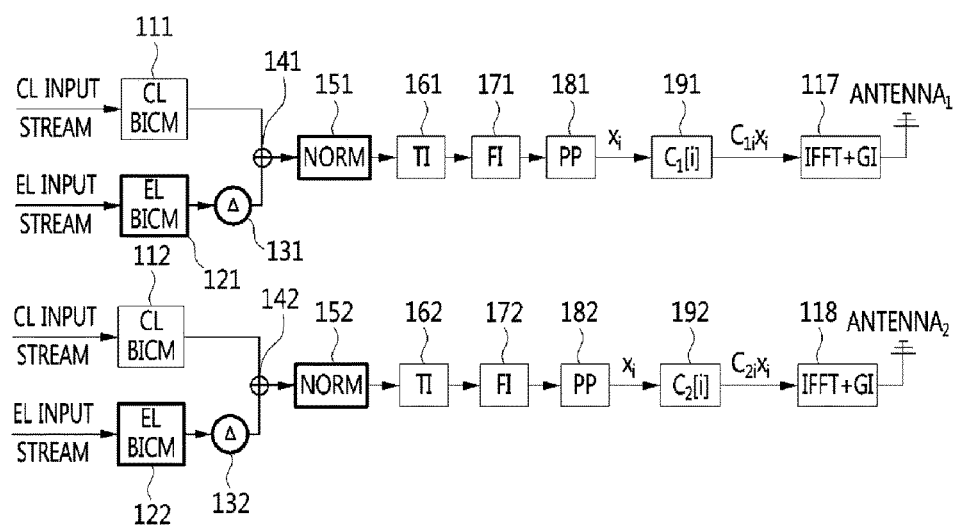
FIG. 1 is a block diagram illustrating an apparatus for transmitting a broadcast signal for MISO according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

A MISO scheme may be chiefly divided into two types, namely phase/frequency predistortion and Space-Time Block Coding (STBC).

In the present invention, MISO is a concept including not only the case where broadcast signals are received from different transmitters, but also the case where broadcast signals transmitted from a single transmitter through multiple antennas are received.

Phase/frequency predistortion is intended to decorrelate signals from different transmitters using a specific phase-distortion algorithm. Here, the phase-distortion algorithm may be a linear phase-distortion algorithm. This decorrelation reduces the presence of frequency-selective fades. Among these techniques, there is an enhanced Single Frequency Network (eSFN).

The signals at the center of an SFN may cancel each other at a receiver. In order to avoid such negative effects, a linear phase predistortion algorithm may be used at a transmitter. This predistortion should be unique for each transmitter, and should be different across Orthogonal Frequency Division Multiplexing (OFDM) subcarriers. However, a transmitted signal may be represented by the following Equation (1):

$$T_x(i)=S(i) \cdot C_x(i) \qquad (1)$$

where i denotes an index indicating an OFDM subcarrier, $S(i)$ denotes a non-distorted complex symbol, $C_x(i)$ denotes the complex predistortion function of transmitter x corresponding to a subcarrier i, and $T_x(i)$ denotes a transmitted complex symbol for the transmitter x.

As one of phase/frequency predistortion schemes, there is a Transmit Diversity Code Filter Set (TDCFS). TDCFS provides higher signal decorrelation performance in a frequency domain. In TDCFS, linear frequency domain filters are used such that compensation in the receiver is implemented in an equalization process. The linear frequency domain filters may be all-pass filters with minimized cross-correlation under the constraints of the number of transmitters (a maximum of four transmitters) and the time domain span of the filters (64- or 256-filter length).

These predistortion schemes do not require special signal processing at receivers, and thus the receivers may regard the predistortion function $C_x(i)$ as part of a channel.

When MISO and LDM are used together, enhanced layer (EL) subcarriers are regarded as additional noise for core layer (CL) decoding, and thus it may be considered that the core layer (CL) obtains major MISO gains. However, since filters are applied to the sum of two layers, gains may be obtained in the two layers.

In the case of STBC, a data stream to be transmitted may be encoded in a pair of orthogonal blocks that are distributed among spaced antennas and across time. Among STBC schemes, Alamouti encoding or variants thereof are actively used for digital terrestrial broadcasting. In Alamouti encoding variants used in Digital Video Broadcasting Second Generation Terrestrial (DVB-T2) or DVB Next Generation Handheld (DVB-NGH), a pair of time indices is replaced with a pair of frequency indices so as to configure an orthogonal Space Frequency Block Code (SFBC).

DVB Alamouti encoding divides available transmitters into two groups. Signals from the transmitters in the first group are transmitted without any modification, but signals from the transmitters in the second group are transmitted in the state in which they are modified into Quadrature Amplitude Modulation (QAM) symbol blocks so as to maintain orthogonality between the two transmitter groups. Encoded subcarriers $Y_{mi}$ (Tx1) for MISO transmitters in the first group and encoded subcarriers $Y_{mi}$ (Tx2) for MISO transmitters in the second group are represented by the following Equation (2):

$$Y_{mi}(Tx1)=X_{mi}; Y_{mi+1}(Tx1)=X_{mi+1},$$
$$i \in \{0,2,4,\ldots,N_{data}-2\}$$

$$Y_{mi}(Tx2)=-X_{mi+1}{}^{*}; Y_{mi+1}(Tx2)=X_{mi}{}^{*},$$
$$i \in \{0,2,4,\ldots,N_{data}-2\} \qquad (2)$$

where * denotes a complex conjugate operation, $N_{data}$ denotes the number of data subcarriers from a current OFDM symbol m, and $X_{mi}$ denotes i-th subcarrier data before being encoded.

Alamouti decoding requires a change in the structure of receivers in addition to the requirement of additional complexity at transmitters. Although only a single receiving antenna is required, there is a need to estimate the channel frequency responses (CFRs) of two MISO transmitter groups. Therefore, orthogonal pilot patterns must be used between the transmitter groups. As a result, the Alamouti scheme causes doubled pilot overhead compared to the phase/frequency predistortion scheme, and each receiver requires additional complexity because it must restore components from combined signals.

When LDM and Alamouti are combined and used, the receiver may need a more complicated channel estimation process (i.e. estimates for two channels are needed) and additional Alamouti decoding.

A MISO distributed Alamouti scheme divides transmitters in the SFN into two groups. Therefore, in networks having three or more transmitters, the same signal is transmitted from two or more transmitters, and thus Alamouti performance is degraded. In order to reduce such performance degradation, a TDCFS scheme for providing filter sets for a maximum of four transmitters may be combined with the Alamouti scheme. A combination of the TDCFS scheme with the Alamouti scheme enables transmission over the SFN including a maximum of eight transmitters. Here, compared to the case where only Alamouti is used, the complexity of the receiver is not greatly increased.

FIG. 1 is a block diagram illustrating an apparatus for transmitting a broadcast signal for MISO (hereinafter also referred to as a "broadcast signal transmission apparatus for MISO") according to an embodiment of the present invention.

Referring to FIG. 1, the broadcast signal transmission apparatus for MISO according to the embodiment of the present invention may include core layer bit-interleaved coded modulation (BICM) units 111 and 112, enhanced-layer BICM units 121 and 122, injection level controllers 131 and 132, combiners 141 and 142, power normalizers 151 and 152, time interleavers 161 and 162, frequency interleavers 171 and 172, pilot pattern injection units 181 and 182, predistortion units 191 and 192, and RF signal generation units 117 and 118.

Details related to the core-layer BICM units 111 and 112, the enhanced-layer BICM units 121 and 122, the injection level controllers 131 and 132, the combiners 141 and 142, the power normalizers 151 and 152, the time interleavers 161 and 162, the frequency interleavers 171 and 172, and the pilot pattern injection units 181 and 182, which are illustrated in FIG. 1, are disclosed in Korean Patent Application Publication No. 2017-0009737 and elsewhere.

The same core layer (CL) stream is input to the core-layer BICM units 111 and 112, and the same enhanced layer (EL) stream is input to the enhanced-layer BICM units 121 and 122. The core-layer BICM units 111 and 112 and the enhanced-layer BICM units 121 and 122 perform channel coding, bit interleaving, and modulation on the input data.

The injection level controllers 131 and 132 generate power-reduced enhanced-layer signals by reducing the powers of respective enhanced-layer signals. Here, the strengths of signals controlled by the injection level controllers 131 and 132 may be determined depending on the injection levels.

Each of the combiners 141 and 142 generates a multiplexed signal by combining the corresponding core-layer signal with the corresponding enhanced-layer signal at different power levels.

The power normalizers 151 and 152 may generate power-normalized signals by reducing the powers of respective multiplexed signals to a level corresponding to the core-layer signal.

The time interleavers 161 and 162 generate time-interleaved signals by time-interleaving the power-normalized signals, respectively.

The frequency interleavers 171 and 172 generate frequency-interleaved signals by frequency-interleaving the respective time-interleaved signals.

The pilot pattern injection units 181 and 182 inject pilot patterns into the respective frequency-interleaved signals.

In FIG. 1, the output $x_i$ of each of the pilot pattern injection units 181 and 182 denotes data corresponding to an i-th subcarrier (layered division multiplexed data), and is the target of MISO processing.

The predistortion units 191 and 192 are configured to reduce the correlation (decorrelate) between signals respectively corresponding to the two antennas $ANTENNA_1$ and $ANTENNA_2$ by predistorting data. Here, the predistortion units 191 and 192 may perform predistortion processing using a Transmit Diversity Code Filter Set (TDCFS).

In the example illustrated in FIG. 1, the predistortion units 191 and 192 may correspond to a MISO processing unit.

The RF signal generation units 117 and 118 generate RF transmission signals which are to be transmitted through antennas using the predistorted (i.e. MISO-processed) signals, respectively.

In the example illustrated in FIG. 1, the signal corresponding to the antenna $ANTENNA_1$ and the signal corresponding to the antenna $ANTENNA_2$ are generated based on the same data stream.

The antenna $ANTENNA_1$ of FIG. 1 is independent of the antenna $ANTENNA_2$, and the two antennas $ANTENNA_1$ and $ANTENNA_2$ may be provided in different transmission apparatuses, or may be provided in a single transmission apparatus.

In FIG. 1, the case where signals that are input to the predistortion units 191 and 192 are separately generated has been described by way of example. However, at least any of the core-layer BICM unit 112, the enhanced-layer BICM unit 122, the injection level controller 132, the combiner 142, the power normalizer 152, the time interleaver 162, the frequency interleaver 172, and the pilot pattern injection unit 182 may not be separately provided. In this case, the signal input to the predistortion unit 192 may be same signal as the signal input to the predistortion unit 191, or may be a signal obtained by duplicating the signal input to the predistortion unit 191.

Figure 2:
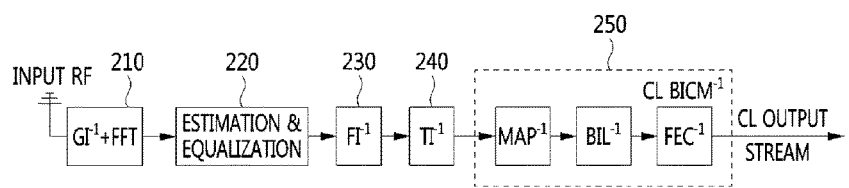
FIG. 2 is a block diagram illustrating a mobile apparatus for receiving a broadcast signal for MISO according to an embodiment of the present invention.

FIG. 2 is a block diagram illustrating a mobile apparatus for receiving a broadcast signal for MISO (hereinafter also referred to as a "mobile broadcast signal reception apparatus for MISO") according to an embodiment of the present invention.

Referring to FIG. 2, the mobile broadcast signal reception apparatus for MISO according to the embodiment of the present invention includes an RF reception unit 210, an estimation and equalization unit 220, a frequency deinterleaver 230, a time deinterleaver 240, and a core-layer BICM decoder 250.

The mobile broadcast signal reception apparatus for MISO, illustrated in FIG. 2, restores only a core layer (CL) signal without restoring an enhanced layer (EL) signal even when a layered division multiplexed (LDM)-broadcast signal is transmitted.

The RF reception unit 210 generates a received signal by receiving signals that have been transmitted through two antennas.

The estimation and equalization unit 220 performs channel estimation and equalization. Here, the estimation and equalization unit may regard predistortion performed by the transmission apparatus as part of a channel, and may compensate for the predistortion in the equalization process.

The frequency deinterleaver 230 performs deinterleaving in a frequency domain, and the time interleaver 240 performs deinterleaving in a time domain.

The core-layer BICM decoder 250 may perform the inverse of the process performed by the core-layer BICM unit of the transmission apparatus. Details related to the core-layer BICM decoder 250 are disclosed in detail in Korean Patent Application Publication No. 2017-0009737 and elsewhere.

Figure 3:
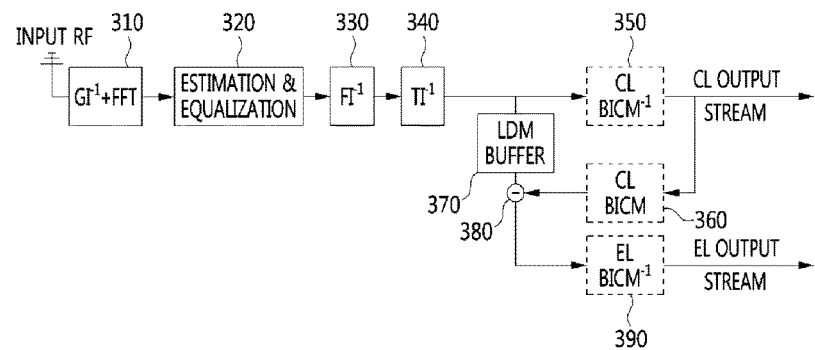
FIG. 3 is a block diagram illustrating a fixed apparatus for receiving a broadcast signal for MISO according to an embodiment of the present invention.

FIG. 3 is a block diagram illustrating a fixed apparatus for receiving a broadcast signal for MISO (hereinafter also referred to as a "fixed broadcast signal reception apparatus for MISO") according to an embodiment of the present invention.

Referring to FIG. 3, the fixed broadcast signal reception apparatus for MISO according to the embodiment of the present invention includes an RF reception unit 310, an estimation and equalization unit 320, a frequency deinterleaver 330, a time deinterleaver 340, a core-layer BICM decoder 350, a core-layer BICM unit 360, an LDM buffer 370, a subtractor 380, and an enhanced-layer BICM decoder 390.

The fixed broadcast signal reception apparatus for MISO, illustrated in FIG. 3, restores a core-layer signal and an enhanced-layer signal by receiving a layered division multiplexed (LDM)-broadcast signal.

The RF reception unit 310 generates a received signal by receiving signals that have been transmitted through two antennas.

Here, the signals respectively corresponding to the two antennas may be based on the same data stream.

The estimation and equalization unit 320 performs channel estimation and equalization. Here, the estimation and equalization unit may regard predistortion performed by the transmission apparatus as part of a channel, and may compensate for the predistortion in the equalization process.

In an embodiment, a MISO processing unit may correspond to the estimation and equalization unit 320 illustrated in FIG. 3. Here, MISO processing performed by the MISO processing unit may be compensation for predistortion performed by the transmission apparatus. Here, MISO processing may be performed in the equalization process by regarding predistortion as part of the channel Here, MISO processing may correspond to TDCFS.

The frequency deinterleaver 330 performs deinterleaving in the frequency domain, and the time deinterleaver 340 performs deinterleaving in the time domain.

The core-layer BICM decoder 350 performs the inverse of the process performed by the core-layer BICM unit of the transmission apparatus.

The core-layer BICM unit 360 again performs BICM on a restored core-layer stream. Cancellation corresponding to the core layer is performed by the LDM buffer 370 and the subtractor 380. The signal on which cancellation corresponding to the core layer is performed is restored into an enhanced layer output stream through the enhanced-layer BICM decoder 390.

Details related to the restoration of the enhanced-layer signal, which is performed through the core-layer BICM decoder 350, the enhanced-layer BICM decoder 390, and cancellation corresponding to the core layer, are disclosed in Korean Patent Application Publication No. 2017-0009737 and elsewhere.

Although not explicitly illustrated in FIGS. 2 and 3, a power denormalizer for performing the inverse of the function of the power normalizer may be provided upstream of the core-layer BICM decoder.

The received signal, which has been transmitted through the transmission apparatus illustrated in FIG. 1 and is received through the reception apparatus of FIG. 2 or 3, is represented by the following Equation (3):

$$y_i = (h_{1,i} \cdot C_1[i] + h_{2,i} \cdot C_2[i]) \cdot (CL_i + EL_i) + n_i \qquad (3)$$

where i denotes a subcarrier index, h denotes a channel, C denotes a predistortion function, $(CL_i + EL_i)$ denotes data representing a combination of core-layer data and enhanced-layer data, which is $x_i$ of FIG. 1, and n denotes noise.

The channel estimator of each of the reception apparatuses illustrated in FIGS. 2 and 3 provide a combination of two channels with their corresponding filtering as a unique channel frequency response.

Figure 4:
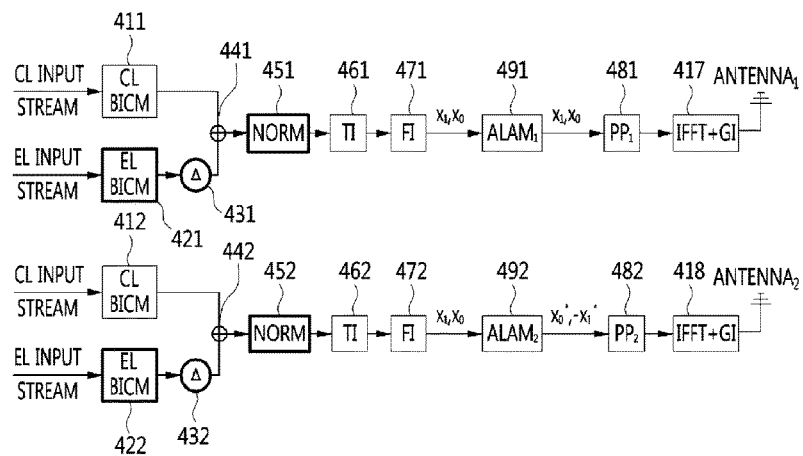
FIG. 4 is a block diagram illustrating an apparatus for transmitting a broadcast signal for MISO according to another embodiment of the present invention.

FIG. 4 is a block diagram illustrating an apparatus for transmitting a broadcast signal for MISO according to another embodiment of the present invention.

Referring to FIG. 4, the broadcast signal transmission apparatus for MISO according to the embodiment of the present invention includes core-layer BICM units 411 and 412, enhanced-layer BICM units 421 and 422, injection level controllers 431 and 432, combiners 441 and 442, power normalizers 451 and 452, time interleavers 461 and 462, frequency interleavers 471 and 472, Alamouti encoders 491 and 492, pilot pattern injection units 481 and 482, and RF signal generation units 417 and 418.

The core-layer BICM units 411 and 412, the enhanced-layer BICM units 421 and 422, the injection level controllers 431 and 432, the combiners 441 and 442, the power normalizers 451 and 452, the time interleavers 461 and 462, the frequency interleavers 471 and 472, and the pilot pattern injection units 481 and 482, which are illustrated in FIG. 4, have been described above with reference to FIG. 1, and detailed descriptions thereof are disclosed in Korean Patent Application Publication No. 2017-0009737.

The same core-layer stream is input to the core-layer BICM units 411 and 412, and the same enhanced-layer stream is input to the enhanced-layer BICM units 421 and 422. The core-layer BICM units 411 and 412 and the enhanced-layer BICM units 421 and 422 perform channel coding, bit interleaving, and modulation on the input data.

The injection level controllers 431 and 432 generate power-reduced enhanced-layer signals by reducing the powers of respective enhanced-layer signals. Here, the strengths of signals controlled by the injection level controllers 431 and 432 may be determined depending on injection levels.

Each of the combiners 441 and 442 generates a multiplexed signal by combining the corresponding core-layer signal with the corresponding enhanced-layer signal at different power levels.

The power normalizers 451 and 452 generate power-normalized signals by reducing the powers of respective multiplexed signals to a level corresponding to the core-layer signal.

The time interleavers 461 and 462 generate time-interleaved signals by time-interleaving the power-normalized signals, respectively.

The frequency interleavers 471 and 472 generate frequency-interleaved signals by frequency-interleaving the time-interleaved signals, respectively.

In FIG. 4, the output $x_i$ of each of the frequency interleavers 471 and 472 denotes data corresponding to an i-th subcarrier (i.e. layered division multiplexed data), and is the target of MISO processing.

The Alamouti encoders 491 and 492 divide signals to be transmitted through two antennas $ANTENNA_1$ and $ANTENNA_2$ into two groups. The Alamouti encoders 491 and 492 transmit signals, which are to be transmitted through the first antenna $ANTENNA_1$ (i.e. the first group), without any modification, and transmit signals, which are to be transmitted through the second antenna $ANTENNA_2$ (i.e. the second group), after modifying the signals into two QAM symbol blocks in order to maintain orthogonality between the groups. For example, the Alamouti encoders 491 and 492 may perform encoding represented by Equation (2).

The pilot pattern injection units 481 and 482 inject pilot patterns into respective Alamouti-encoded signals. Here, the pilot pattern injection units 481 and 482 may inject different pilot patterns, and may have structures that are more complicated than those of the pilot pattern injection units illustrated in FIG. 1, thus enabling more pilot patterns to be injected.

In the example illustrated in FIG. 4, the Alamouti encoders 491 and 492 and the pilot pattern injection units 481 and 482 may correspond to a MISO processing unit. That is, the Alamouti encoders 491 and 492 may perform Alamouti encoding for reducing the correlation (decorrelating) between the signal corresponding to the antenna $ANTENNA_1$ and the signal corresponding to the antenna $ANTENNA_2$, and the pilot pattern injection units 481 and 482 may perform MISO processing by injecting pilot patterns into respective group signals. Here, Alamouti encoding may be intended to maintain orthogonality between the signal corresponding to the antenna $ANTENNA_1$ and the signal corresponding to the antenna $ANTENNA_2$. That is, Alamouti encoding for allowing two transmission signals to have orthogonality therebetween may also be regarded as a process for reducing the correlation (decorrelating) between the two transmission signals.

The RF signal generation units 417 and 418 generate RF transmission signals which are to be transmitted through the antennas using signals which are respectively Alamouti-encoded and into which pilot patterns are injected.

In the example illustrated in FIG. 4, the signal corresponding to the antenna $ANTENNA_1$ and the signal corresponding to the antenna $ANTENNA_2$ are generated based on the same data stream.

The antenna $ANTENNA_1$ of FIG. 4 is independent of the antenna $ANTENNA_2$, and the two antennas $ANTENNA_1$ and $ANTENNA_2$ may be provided in different transmission apparatuses, or may be provided in a single transmission apparatus.

In FIG. 4, the case where signals that are input to the Alamouti encoders 491 and 492 are separately generated has been described by way of example. However, at least any of the core-layer BICM unit 412, the enhanced-layer BICM unit 422, the injection level controller 432, the combiner 442, the power normalizer 452, the time interleaver 462, and the frequency interleaver 472 may not be separately provided. In this case, the signal input to the Alamouti encoder 492 may be same signal as the signal input to the Alamouti encoder 491, or may be a signal obtained by duplicating the signal input to the Alamouti encoder 491.

Figure 5:
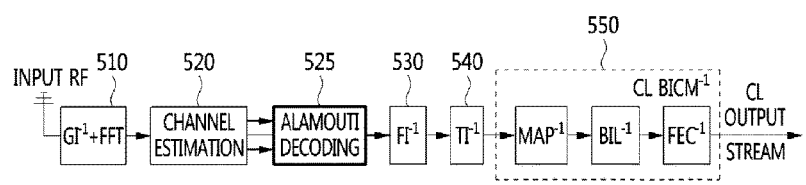
FIG. 5 is a block diagram illustrating a mobile apparatus for receiving a broadcast signal for MISO according to another embodiment of the present invention.

FIG. 5 is a block diagram illustrating a mobile apparatus for receiving a broadcast signal for MISO according to another embodiment of the present invention.

Referring to FIG. 5, the mobile broadcast signal reception apparatus for MISO according to the embodiment of the present invention includes an RF reception unit 510, a channel estimation unit 520, an Alamouti decoder 525, a frequency deinterleaver 530, a time deinterleaver 540, and a core-layer BICM decoder 550.

The mobile broadcast signal reception apparatus for MISO, illustrated in FIG. 5, restores only a core-layer signal without restoring an enhanced-layer signal even when a layered division multiplexed (LDM) broadcast signal is transmitted.

The RF reception unit 510 generates a received signal by receiving signals that have been transmitted through two antennas.

The channel estimation unit 520 estimates Channel Frequency Responses (CFRs) for both channels from the two transmitting antennas. For this, the transmission apparatus may use orthogonal pilot patterns between the two antennas.

The Alamouti decoder 525 performs a decoding operation corresponding to the Alamouti encoding of the transmission apparatus.

In this case, the Alamouti decoder 525 may perform Alamouti decoding based on channel estimation both for a channel $h_1$, corresponding to the signal of the antenna $ANTENNA_1$, and for a channel $h_2$, corresponding to the signal of the antenna $ANTENNA_2$.

The frequency deinterleaver 530 performs deinterleaving in the frequency domain, and the time deinterleaver 540 performs deinterleaving in the time domain.

The core-layer BICM decoder 550 performs the inverse of the process performed by the core-layer BICM unit of the transmission apparatus. Details related to the core-layer BICM decoder 550 are disclosed in Korean Patent Application Publication No. 2017-0009737 and elsewhere.

Figure 6:
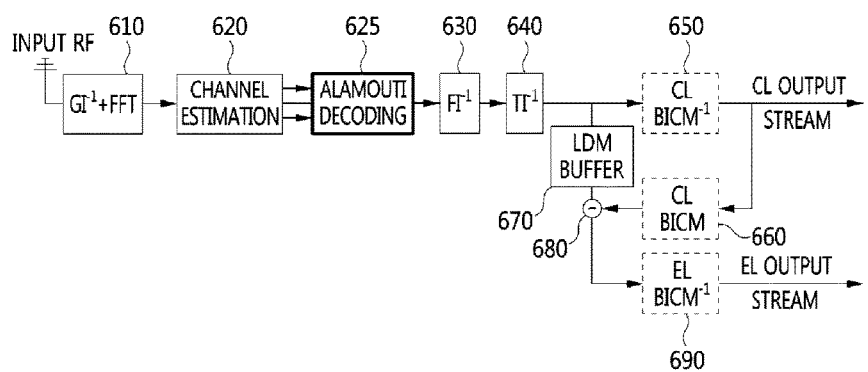
FIG. 6 is a block diagram illustrating a fixed apparatus for receiving a broadcast signal for MISO according to another embodiment of the present invention.

FIG. 6 is a block diagram illustrating a fixed apparatus for receiving a broadcast signal for MISO according to another embodiment of the present invention.

Referring to FIG. 6, the fixed broadcast signal reception apparatus for MISO according to the embodiment of the present invention includes an RF reception unit 610, a channel estimation unit 620, an Alamouti decoder 625, a frequency deinterleaver 630, a time deinterleaver 640, a core-layer BICM decoder 650, a core-layer BICM unit 660, an LDM buffer 670, a subtractor 680, and an enhanced-layer BICM decoder 690.

The fixed broadcast signal reception apparatus for MISO, illustrated in FIG. 6, restores a core-layer (CL) signal and an enhanced-layer (EL) signal by receiving a layered division multiplexed (LDM) broadcast signal.

The RF reception unit 610 generates a received signal by receiving signals that have been transmitted through two antennas.

Here, the signals respectively corresponding to the two antennas may be based on the same data stream.

The channel estimation unit 620 estimates Channel Frequency Responses (CFR) for both channels from the two transmitting antennas. For this, the transmission apparatus may use orthogonal pilot patterns between the two antennas.

The Alamouti decoder 625 performs a decoding operation corresponding to the Alamouti encoding of the transmission apparatus.

In this case, the Alamouti decoder 625 may perform Alamouti decoding based on channel estimation both for a channel $h_1$ corresponding to the signal of the antenna ANTENNA$_1$ and for a channel h$_2$ corresponding to the signal of the antenna ANTENNA$_2$.

A MISO processing unit may correspond to the channel estimation unit 620 and the Alamouti decoder 625 illustrated in FIG. 6. Here, MISO processing performed by the MISO processing unit may include channel estimation for Alamouti decoding and the Alamouti decoding itself.

The frequency deinterleaver 630 performs deinterleaving in the frequency domain, and the time deinterleaver 640 performs deinterleaving in the time domain.

The core-layer BICM decoder 650 performs the inverse of the process performed by the core-layer BICM unit of the transmission apparatus.

The core-layer BICM unit 660 again performs BICM on a restored core-layer stream. Cancellation corresponding to the core layer is performed by the LDM buffer 670 and the subtractor 680. The signal on which cancellation corresponding to the core layer is performed is restored into an enhanced layer output stream through the enhanced-layer BICM decoder 690.

Details related to the restoration of the enhanced-layer signal, which is performed through the core-layer BICM decoder 650, the enhanced-layer BICM decoder 690, and cancellation corresponding to the core layer, are disclosed in Korean Patent Application Publication No. 2017-0009737 and elsewhere.

Although not explicitly illustrated in FIGS. 5 and 6, a power denormalizer for performing the inverse of the function of the power normalizer may be provided upstream of the core-layer BICM decoder.

The received signals, which have been transmitted through the transmission apparatus illustrated in FIG. 4 and are received through the reception apparatuses of FIGS. 5 and 6, are represented by the following Equation (4):

$$y_i = h_{1,i} \cdot (CL_i + EL_i) - h_{2,i} \cdot (CL_{i+1} + EL_{i+1})^* + n_i$$

$$y_{i+1} = h_{1,i+1} \cdot (CL_{i+1} + EL_{i+1}) + h_{2,i+1} \cdot (CL_i + EL_i)^* + n_{i+1} \quad (4)$$

where i denotes a subcarrier index, h denotes a channel, * denotes a complex conjugate operation, $(CL_i + EL_i)$ denotes data representing a combination of core-layer data and enhanced-layer data, which is $x_i$ of FIG. 4, and n denotes noise.

The channel estimators of the reception apparatuses illustrated in FIGS. 5 and 6 independently provide two channel frequency responses. In order to use orthogonalization, Alamouti decoding is required. Alamouti decoding may be given by the following Equation (5):

$$\begin{bmatrix} y_i \\ y_{i+1}^* \end{bmatrix} = \begin{bmatrix} h_{1,i} & -h_{2,i} \\ h_{2,i+1}^* & h_{1,i+1}^* \end{bmatrix} \begin{bmatrix} CL_i + EL_i \\ CL_{i+1}^* + EL_{i+1}^* \end{bmatrix} + \begin{bmatrix} n_i \\ n_{i+1}^* \end{bmatrix} \quad (5)$$

The meanings of the respective symbols have been described above.

Generally, when LDM is combined with a MISO scheme, Alamouti may have pilot overhead that is twice that of TDCFS. However, when Alamouti encoding is used, higher gain may be obtained compared to when TDCFS is used.

Figure 7:
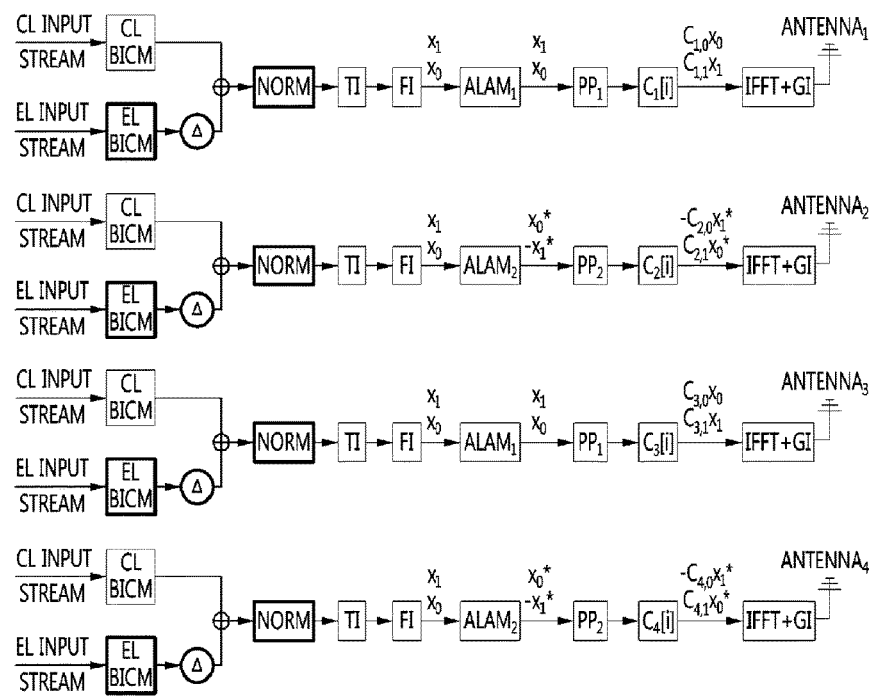
FIGS. 7 and 8 are block diagrams illustrating apparatuses for transmitting a broadcast signal for MISO according to other embodiments of the present invention.
Figure 8:
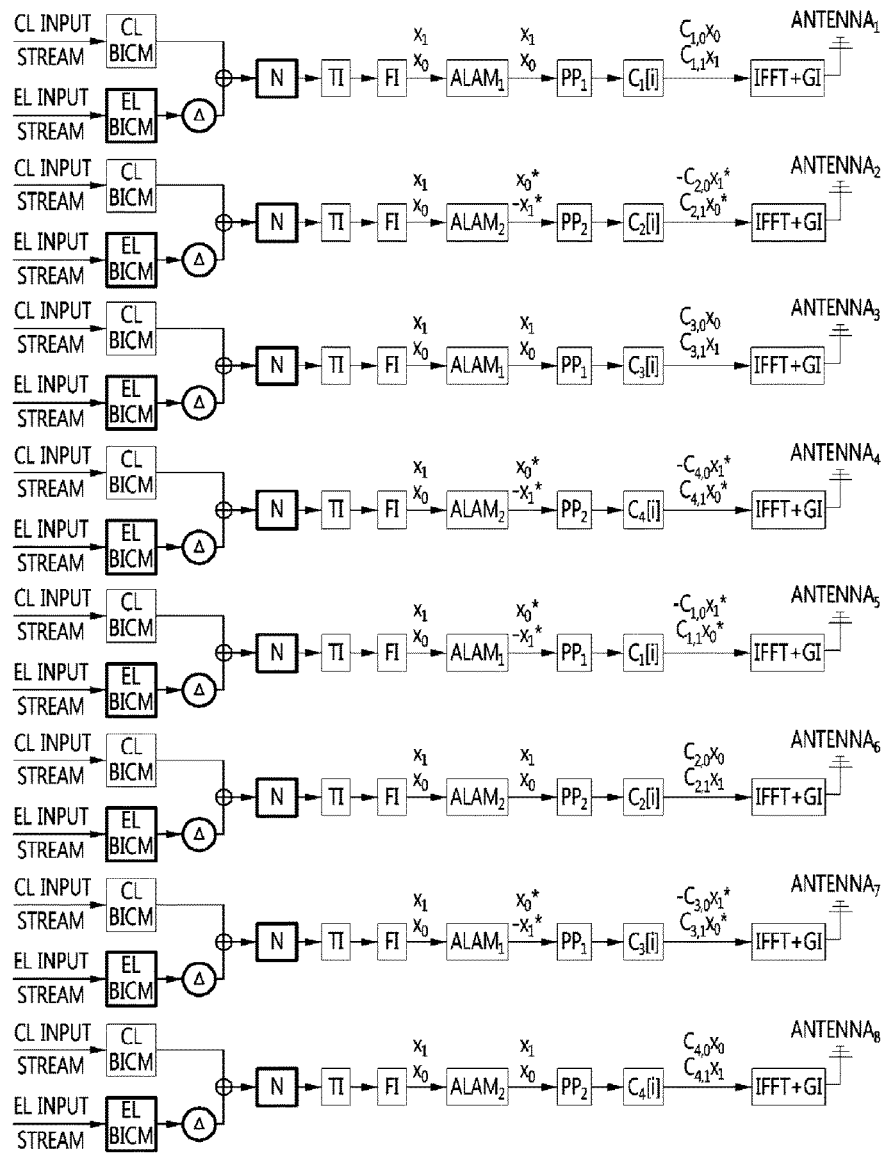

FIGS. 7 and 8 are block diagrams illustrating apparatuses for transmitting a broadcast signal (hereinafter also referred to as "broadcast signal transmission apparatuses") for MISO according to other embodiments of the present invention.

FIGS. 7 and 8 illustrate an example in which a MISO scheme, in which TDCFS is combined with Alamouti, is combined with LDM, wherein FIG. 7 shows the case where the number of transmitting antennas is 4 and FIG. 8 shows the case where the number of transmitting antennas is 8.

Referring to FIG. 7, it can be seen that, in the structure of the broadcast signal transmission apparatus, a predistortion unit is added downstream of a pilot pattern injection unit.

That is, the example illustrated in FIG. 7 may decrease degradation in Alamouti performance even when Alamouti encoding is applied to signal transmission that uses four antennas by applying four types of predistortion functions $C_1[i]$, $C_2[i]$, $C_3[i]$, and $C_4[i]$ (filter sets).

Referring to FIG. 8, a structure for four upper antennas is identical to that of FIG. 7, and a structure for four lower antennas is configured by inversely applying MISO encoding. That is, in the structure for the four lower antennas, Alamouti$_1$ encoding is followed by $C_2[i]$ and $C_4[i]$, and Alamouti$_2$ encoding is followed by $C_1[i]$ and $C_3[i]$.

The signals transmitted through the broadcast signal transmission apparatus illustrated in FIG. 7 or 8 may be received and restored by the reception apparatus illustrated in FIG. 5 or 6. Here, a channel estimation unit may perform compensation for predistortion via equalization.

The signals, which have been transmitted through the broadcast signal transmission apparatus illustrated in FIG. 7 and are received by the reception apparatus, are represented by the following Equation (6):

$$y_i = (C_{1,i} h_{1,i} + C_{3,i} h_{3,i}) \cdot (CL_i + EL_i) + \ldots$$

$$\ldots - (C_{2,i} h_{2,i} + C_{4,i} h_{4,i}) \cdot (CL_{i+1} + EL_{i+1})^* + n_i$$

$$y_{i+1} = (C_{1,i+1} h_{1,i+1} + C_{3,i+1} h_{3,i+1}) \cdot (CL_{i+1} + EL_{i+1}) + \ldots$$

$$\ldots + (C_{2,i+1} h_{2,i+1} + C_{4,i+1} h_{4,i+1}) \cdot (CL_i + EL_i)^* + n_{i+1} \quad (6)$$

where i denotes a subcarrier index, h denotes a channel, C denotes a predistortion function, * denotes a complex conjugate operation, $(CL_i + EL_i)$ denotes data representing a combination of core-layer data and enhanced-layer data, which is $x_i$ of FIG. 7, and n denotes noise.

The channel estimator of each of reception apparatuses provides channel frequency responses in pairs of two. In order to use orthogonalization, Alamouti decoding is required. Alamouti decoding may be given by the following Equation (7):

$$\begin{bmatrix} y_i \\ y_{i+1}^* \end{bmatrix} = \begin{bmatrix} C_{1,i} h_{1,i} + C_{3,i} h_{3,i} & \ldots (C_{2,i} h_{2,i} + C_{4,i} h_{4,i}) \\ (C_{2,i+1} h_{2,i+1} + C_{4,i+1} h_{4,i+1})^* & (C_{1,i+1} h_{1,i+1} + C_{3,i+1} h_{3,i+1})^* \end{bmatrix} \quad (7)$$

$$\begin{bmatrix} CL_i + EL_i \\ CL_{i+1}^* + EL_{i+1}^* \end{bmatrix} + \begin{bmatrix} n_i \\ n_{i+1}^* \end{bmatrix}$$

The meanings of the respective symbols have been described above.

The signals, which have been transmitted through the broadcast signal transmission apparatus illustrated in FIG. 8 and are received through the reception apparatus, are represented by the following Equation (8):

$$y_i = (C_{1,i} h_{1,i} + C_{3,i} h_{3,i} + C_{2,i} h_{6,i} + C_{4,i} h_{8,i}) \cdot (CL_i + EL_i) - \ldots$$

$$\ldots - (C_{2,i} h_{2,i} + C_{4,i} h_{4,i} + C_{1,i} h_{5,i} + C_{7,i} h_{3,i}) \cdot (CL_{i+1} + EL_{i+1})^* + n_i$$

$$y_{i+1} = (C_{1,i+1} h_{1,i+1} + C_{3,i+1} h_{3,i+1} + C_{2,i+1} h_{6,i+1} + C_{4,i+1} h_{3,i+1}) \cdot (CL_{i+1} + EL_{i+1}) + \ldots$$

$$\ldots + (C_{2,i+1} h_{2,i+1} + C_{4,i+1} h_{4,i+1} + C_{1,i+1} h_{5,i+1} + C_{3,i+1} h_{7,i+1}) \cdot (CL_i + EL_i)^* + n_{i+1} \quad (8)$$

where i denotes a subcarrier index, h denotes a channel, C denotes a predistortion function, * denotes a complex conjugate operation, ($CL_i+EL_i$) denotes data representing a combination of core-layer data and enhanced-layer data, which is $x_i$ of FIG. 8, and n denotes noise.

Alamouti decoding may be given by the following Equation (9):

$$\begin{bmatrix} y_i \\ y_{i+1}^* \end{bmatrix} = \begin{bmatrix} H_{81} & -H_{82} \\ H_{83}^* & H_{84}^* \end{bmatrix} \begin{bmatrix} CL_i + EL_i \\ CL_{i+1}^* + EL_{i+1}^* \end{bmatrix} + \begin{bmatrix} n_i \\ n_{i+1}^* \end{bmatrix} \quad (9)$$

where $$\begin{cases} H_{81} = C_{1,i}h_{1,i} + C_{3,i}h_{3,i} + C_{2,i}h_{6,i} + C_{4,i}h_{8,i} \\ H_{82} = C_{2,i}h_{2,i} + C_{4,i}h_{4,i} + C_{1,i}h_{5,i} + C_{7,i}h_{3,i} \\ H_{83} = C_{2,i+1}h_{2,i+1} + C_{4,i+1}h_{4,i+1} + C_{1,i+1}h_{5,i+1} + C_{3,i+1}h_{7,i+1} \\ H_{84} = C_{1,i+1}h_{1,i+1} + C_{3,i+1}h_{3,i+1} + C_{2,i+1}h_{6,i+1} + C_{4,i+1}h_{8,i+1} \end{cases}$$

Figure 9:
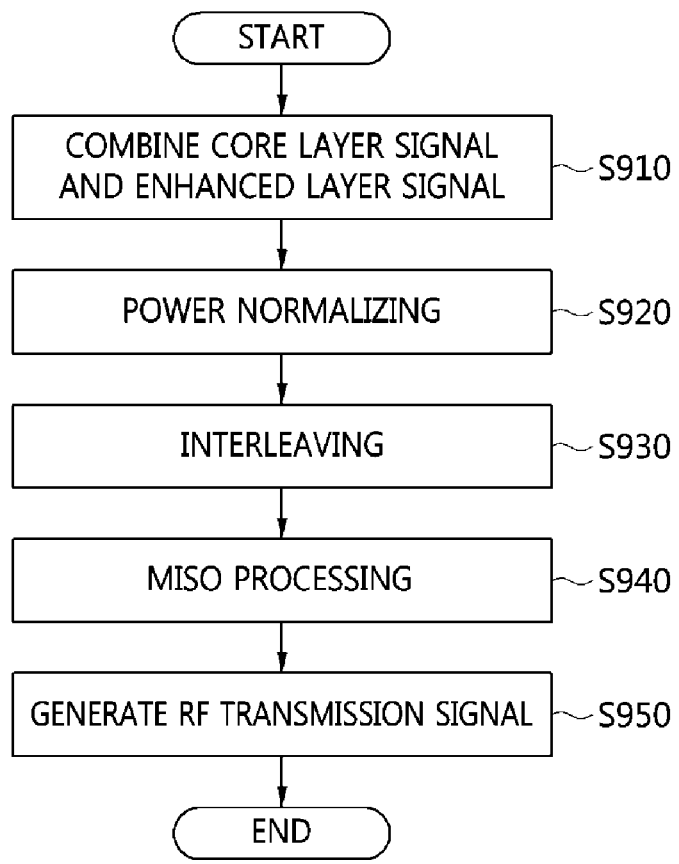
FIG. 9 is an operation flowchart illustrating a method for transmitting a broadcast signal for MISO according to an embodiment of the present invention.

FIG. 9 is an operation flowchart illustrating a method for transmitting a broadcast signal for MISO (hereinafter also referred to as a "broadcast signal transmission method for MISO") according to an embodiment of the present invention.

Referring to FIG. 9, the broadcast signal transmission method for MISO according to the embodiment of the present invention generates a multiplexed signal by combining a core-layer signal with an enhanced-layer signal at different power levels at step S910.

Here, a signal corresponding to a first antenna and a signal corresponding to a second antenna may be generated based on the same data stream.

Here, the first antenna and the second antenna may be independent of each other.

Next, the broadcast signal transmission method for MISO according to the embodiment of the present invention generates a power-normalized signal by reducing the power of the multiplexed signal to a level corresponding to the core-layer signal at step S920.

Further, the broadcast signal transmission method for MISO according to the embodiment of the present invention generates an interleaved signal by interleaving the power-normalized signal at step S930.

Here, the interleaving may be time interleaving, frequency interleaving or a combination thereof.

The broadcast signal transmission method for MISO according to the embodiment of the present invention performs MISO processing which corresponds to the interleaved signal and which reduces the correlation (decorrelates) between the signal corresponding to the first antenna and the signal corresponding to the second antenna at step S940.

The MISO processing may be predistortion processing using a Transmit Diversity Code Filter Set (TDCFS).

The MISO processing may be performed after a pilot pattern has been injected into the frequency-interleaved signal.

The MISO processing may include Alamouti encoding for maintaining orthogonality between the signal corresponding to the first antenna and the signal corresponding to the second antenna.

The MISO processing may inject pilot patterns into the Alamouti-encoded signal.

Next, the broadcast signal transmission method for MISO according to the embodiment of the present invention generates an RF transmission signal to be transmitted through the first antenna using the MISO-processed signal at step S950.

Figure 10:
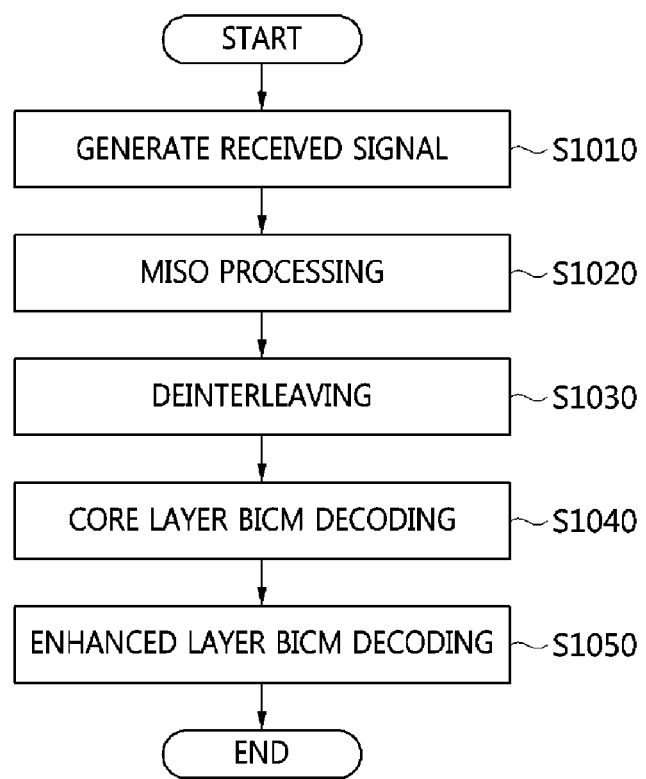
FIG. 10 is an operation flowchart illustrating a method for receiving a broadcast signal for MISO according to an embodiment of the present invention.

FIG. 10 is an operation flowchart illustrating a method for receiving a broadcast signal for MISO (hereinafter also referred to as a "broadcast signal reception method for MISO") according to an embodiment of the present invention.

Referring to FIG. 10, the broadcast signal reception method for MISO according to the embodiment of the present invention generates a received signal by receiving a first antenna signal and a second antenna signal that correspond to the same data stream at step S1010.

Next, the broadcast signal reception method for MISO according to the embodiment of the present invention performs MISO processing on the received signal at step S1020.

Here, the MISO processing may be performed in an equalization process by regarding predistortion as part of a channel.

The MISO processing may include channel estimation both for a first channel corresponding to the first antenna signal and for a second channel corresponding to the second antenna signal, as well as Alamouti decoding based on the channel estimation.

Further, the broadcast signal reception method for MISO according to the embodiment of the present invention generates a deinterleaved signal by applying deinterleaving to the MISO-processed signal at step S1030.

Here, the deinterleaving may be time deinterleaving, frequency deinterleaving or a combination thereof.

Next, the broadcast signal reception method for MISO according to the embodiment of the present invention restores a core-layer signal from the deinterleaved signal at step S1040.

Furthermore, the broadcast signal reception method for MISO according to the embodiment of the present invention restores an enhanced-layer signal based on cancellation corresponding to the core-layer signal at step S1050.

Hereinafter, a combination of MIMO with LDM will be described in detail.

Unlike a Multiple-Input Single-Output (MISO) scheme and a Single-Input Multiple-Output (SIMO) scheme, which may improve only the reliability of a multipath link by using two or more antennas either in a transmitter (transmission apparatus) or in a receiver (reception apparatus), a Multiple-Input Multiple-Output (MIMO) scheme, in which two or more antennas are used on both transmitter and receiver sides, may also improve the bit rate of a service.

In contrast, Layered Division Multiplexing (LDM) may improve frequency efficiency by superimposing two or more signals together at different power levels so as to configure a multi-layer signal.

In the SIMO scheme, only a receiver has two or more antennas. The use of combining techniques such as Maximum-Ratio Combining (MRC) enables SIMO array gain to be obtained.

MISO-SIMO denotes the case where a transmitter and a receiver are not intended to obtain spatial multiplexing gain in the MIMO system, in which two or more antennas are provided on both the transmitter and receiver sides. In this case, the transmitter may obtain diversity gain, and the receiver may obtain array gain. This scheme is also referred to as a "diversity-MIMO" scheme.

MIMO Spatial Multiplexing (MIMO SM) denotes the case where it is desired to exploit spatial multiplexing gain in the MIMO system, in which two or more antennas are provided on both the transmitter and receiver sides.

MIMO broadcasting requires co-located antennas having cross-polarization (cross-polar, i.e. horizontal and vertical polarization). The MIMO transmitter may require two BICM chains, a MIMO demultiplexer, and a MIMO precoder. The MIMO precoder may perform an operation for increasing spatial diversity. As in the case of the MISO Alamouti scheme, MIMO may use orthogonal pilot patterns for orthogonality between antennas. At this time, MIMO may have doubled pilot pattern overhead.

Considering that an increase in the bit rate provided by MIMO spatial multiplexing is expected to be used in the enhanced layer, the combination of LDM with MIMO is grouped into two cases depending on the number of antennas in mobile receivers.

The first group is the case where a mobile receiver is provided only with a single antenna (even in this case, a fixed receiver is provided with two antennas), and the second group is the case where a mobile receiver is provided with two antennas.

Figure 11:
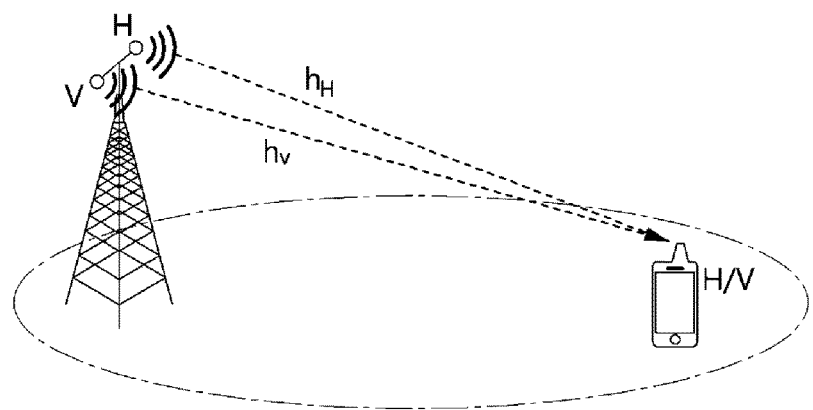
FIGS. 11 and 12 are diagrams illustrating the case of a first group.
Figure 12:
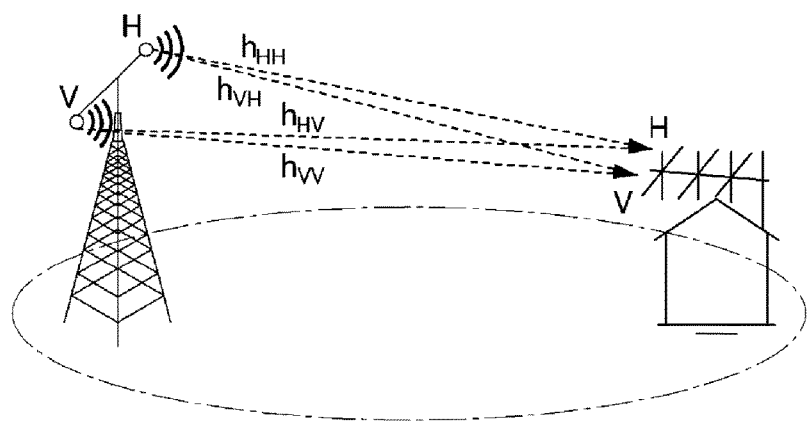

FIGS. 11 and 12 are diagrams illustrating the case of the first group.

Referring to FIG. 11, it can be seen that a transmission apparatus has two transmitting antennas and a mobile reception apparatus has a single receiving antenna, and thus two channels are present between the transmission apparatus and the reception apparatus.

Referring to FIG. 12, it can be seen that a transmission apparatus has two transmitting antennas and a fixed reception apparatus has two receiving antennas, and thus four channels are present between the transmission apparatus and the reception apparatus.

The examples illustrated in FIGS. 11 and 12 may obtain MISO diversity gain on the core layer without increasing the complexity of the mobile reception apparatus. Furthermore, fixed reception apparatuses may exploit MIMO spatial multiplexing to provide higher bit rates for the enhanced layer.

That is, the example of the first group illustrated in FIGS. 11 and 12 shows that MISO is used for the core layer and MIMO spatial multiplexing is used for the enhanced layer, wherein the single antenna of the mobile reception apparatus is intended only for the core layer and two cross-polarized antennas of the fixed reception apparatus are intended for the core layer and the enhanced layer.

As illustrated in FIGS. 11 and 12, two cross-polarized (cross-polar) antennas are provided in the transmission apparatus.

Depending on the polarization of the receiving antennas, a received signal may be constituted by only one of the contributions therefrom or by the sum thereof.

The use cases for the first group may be classified into the following three cases:

1) Plain MISO in CL+MIMO in EL

In this case, transmission apparatuses perform neither an uncorrelation process nor an orthogonalization process. Therefore, the expected MISO diversity gain is limited. The mobile reception apparatuses may be implemented as baseline receivers.

2) MISO TDCFS in CL+MIMO in EL

TDCFS filter sets are used in the transmission apparatuses, but reception apparatuses are simply implemented. However, this scheme may outperform the plain MISO scheme, and may provide diversity gain.

3) MISO Alamouti in CL+MIMO in EL

This scheme may outperform TDCFS, and may provide diversity gain.

However, the complexity of the mobile reception apparatus is increased. The reception apparatuses must primarily obtain two channel estimates and secondarily perform Alamouti decoding. In other contexts, when the receiving antennas have the same polarization as the transmitting antennas, these two additional blocks may be unnecessary.

Figure 13:
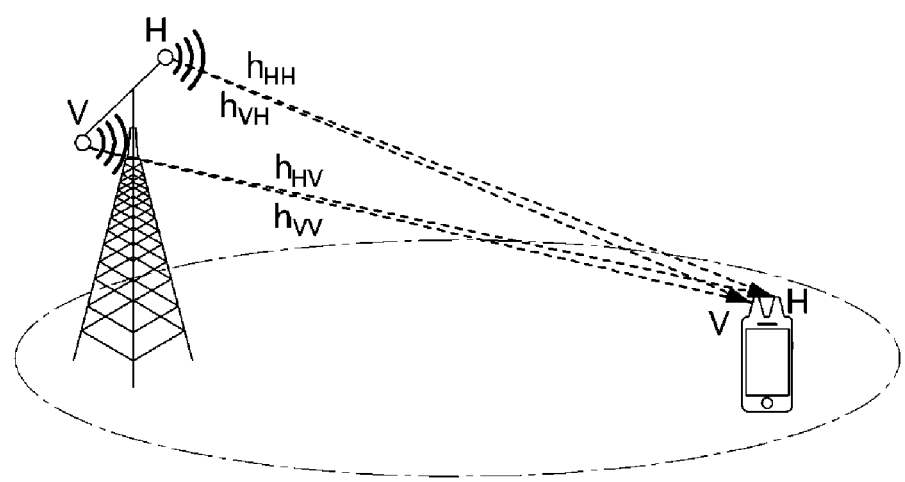
FIG. 13 is a diagram illustrating a mobile receiver in the case of a second group.

FIG. 13 is a diagram illustrating a mobile reception apparatus for the case of the second group.

Even in the case of the second group, a fixed reception apparatus has the same structure as that of FIG. 12.

Referring to FIG. 13, it can be seen that a transmission apparatus has two transmitting antennas and a mobile reception apparatus has two receiving antennas (i.e. two cross-polarized antennas), and thus four channels are present between the transmission apparatus and the reception apparatus.

The example illustrated in FIG. 13 is suitable for the case where the complexity of mobile reception apparatuses is not limited.

In the case of the second group illustrated in FIG. 13, both the fixed and mobile reception apparatuses may exploit not only diversity gain, but also array gain and even multiplexing gain.

The use cases for the second group may be classified into the following two cases.

1) MISO-SIMO (Diversity MIMO) in CL+MIMO SM in EL

In this case, for a core layer, not only MISO diversity gain caused by MISO schemes (i.e. plain MISO, MISO TDCFS or MISO Alamouti) but also SIMO array gain may exploited. Here, additional complicated components are not required in the mobile reception apparatuses, with the exception of an additional receiving antenna, an additional tuner, and a Maximum-Ratio Combining (MRC) block.

2) MIMO SM in Both Layers

This case is suitable for the case where a desired bit rate of the core layer cannot be obtained using a single antenna in the mobile reception apparatuses. In this case, since MIMO multiplexing gain (of the core layer) is very small in a low Signal-to-Noise Ratio (SNR) region, which is a typical core layer SNR region, an embodiment in which the MISO Alamouti is applied to the core layer may be recommended.

When plain MISO or MISO TDCFS is exploited for the core layer, and MIMO spatial multiplexing is exploited for the enhanced layer, a core layer (CL) cell stream may be duplicated in the transmission apparatus, so that the same information may be transmitted in H and V polarizations. MIMO demultiplexing and precoding are primarily performed on an enhanced layer (EL) cell stream which exploits MIMO spatial multiplexing. Subsequently, each EL sub-stream is injected into one of two CL streams. Therefore, there are two LDM signals transmitted in different polarizations (CL+EL$_H$ in horizontal polarization and CL+EL$_V$ in vertical polarization). When TDCFS is used, the two LDM signals are filtered by corresponding filter sets. Orthogonal pilot patterns SP3_4 and SP6_2 may be used. Although this scheme is not required for channel estimation of the core layer, it may be required for correct demodulation on fixed reception apparatuses.

Although different enhanced layer (EL) cells EL$_{H,i}$ and EL$_{V,i}$ are transmitted through respective antennas, it may be assumed that the two enhanced layers interfere with the core layer in the same way as if they are the same. Therefore, the enhanced layers may be treated as additional noise, and mobile reception apparatuses, each having a single antenna, may be baseline receivers.

When the mobile reception apparatus is provided with two antennas, the core layer may obtain array gain through the use of an MRC combining process.

Even on fixed reception apparatuses, for core layer (CL) demodulation, the same core layer MRC combining may be used. Next, in order to demodulate $EL_H$ and $EL_V$, the core layer must be restored and cancelled from a global LDM signal. However, this cancellation is not as straightforward as in SISO. The received symbols of respective antennas ($y_H$ and $y_V$) are constituted by a combination of the CL cells filtered through different channel coefficients ($h_{HH,i} \cdot C_H[i] + h_{HV,i} \cdot C_V[i]$ for $y_H$ and $h_{VH,i} \cdot C_H[i] + h_{VV,i} \cdot C_V[i]$ for $y_V$). Therefore, for proper cancellation, the same combination must be applied. Consequently, $EL_H$ and $EL_V$ may be demodulated as in a MIMO Spatial Multiplexing (SM) system.

When MISO Alamouti is used for the core layer and MIMO Spatial Multiplexing (SM) is used for the enhanced layer, the same core layer cell stream is transmitted both in H and V polarizations, but different enhanced layer (EL) cell streams may be injected into the two core-layer streams. Therefore, there are two LDM signals transmitted in different polarizations ($CL+EL_H$ in horizontal polarization and $CL+EL_V$ in vertical polarization). Finally, instead of TDCFS frequency predistortion, Alamouti encoding is performed on the second antenna.

Again, orthogonal pilot patterns are used. These are required not only for enhanced layer (EL) channel estimation, but also for core layer (CL) Alamouti decoding.

The received symbols may vary depending on the number of receiving antennas of the mobile reception apparatus.

In mobile reception apparatuses, each provided with a single antenna, enhanced layer (EL) cells $EL_H$ and $EL_V$ may be treated as additional noise (i.e. Additive White Gaussian Noise: AWGN). Therefore, an Alamouti decoding process may obtain the spatial diversity gain of Alamouti. However, when the receiving antennas are fully horizontally or vertically polarized, the structure of the system may be simplified. In this case, cross-polarized channel coefficients are negligible. In this scenario, Alamouti decoding may not be required, and thus MISO Alamouti spatial diversity may not be obtained, but a baseline reception apparatus may be used.

When each mobile reception apparatus is provided with two antennas, the core layer may obtain array gain using an MRC combining process. Further, when the polarization of received symbols is not modified through the channel, the structure of the system may be simplified. In this case, by the use of an MRC combining block, diversity gain cannot be obtained, but array gain can be obtained.

In fixed reception apparatuses, core layer (CL) cells are demodulated first, are subsequently remodulated, and are then cancelled. However, such cancellation is slightly complicated. MISO Alamouti should be performed on a remodulated core-layer signal. Therefore, a time interleaver (TI) and a frequency interleaver (H) should be implemented in order to remodulate core layer cells. Thereafter, Alamouti encoding is performed. Next, co-polarized (co-polar) and cross-polarized (cross-polar) channel coefficients are combined accordingly. Finally, to obtain $EL_H$ and $EL_V$, this combination is subtracted from the received LDM signal. After the cancellation process, $EL_{H,i}$ and $EL_{V,i+1}^*$ may be extracted by applying particular Alamouti decoding to $y_{EL1,i}$ and $y_{EL2,i}$. Likewise, $EL_{H,i+1}$ and $EL_{V,i}^*$ may be extracted by applying other specific Alamouti decoding to $y_{EL1,i+i}$ and $y_{EL2,i+1}$.

When MIMO spatial multiplexing is applied to two layers, a common-layer MIMO precoder, or an independent MIMO precoder for each layer, may be used in the transmission apparatus. The use of the independent precoder may be a more flexible solution, but the complexity of the transmission apparatus is undesirably increased. However, MIMO precoder gain depends on a Carrier-to-Noise power Ratio (CNR) threshold (modulation and coding (ModCod) of the layer). Accordingly, the use of the independent precoder provides performance optimized for the two layers.

Although the mobile reception apparatus provided with two antennas is intended for the core layer, the corresponding MIMO decoding may be performed regardless of whether the common or independent MIMO precoder is used.

Even in this case, the core layer cancellation process of the fixed reception apparatus is not straightforward. Core layer remodulation symbols require a MIMO demultiplexer and a MIMO precoder like a transmission chain (for common and independent MIMO precoders). Moreover, since received LDM signals correspond to a combination of two transmitted components, the remodulated symbols must be combined in consideration of channel coefficients. After the core layer (CL) cancellation process, a second MIMO $BICM^{-1}$ chain is performed in order to demodulate the enhanced layer.

Figure 14:
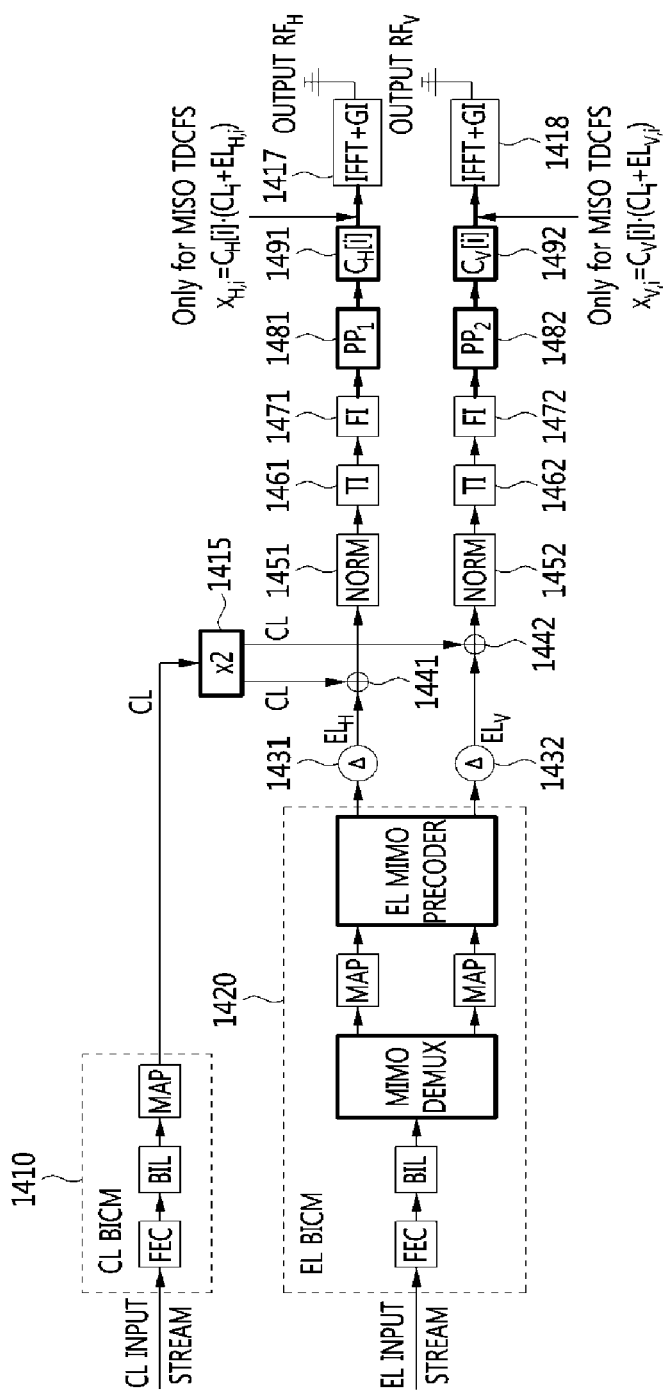
FIG. 14 is a block diagram illustrating an apparatus for transmitting a broadcast signal for MIMO according to an embodiment of the present invention.

FIG. 14 is a block diagram illustrating an apparatus for transmitting a broadcast signal for MIMO (hereinafter also referred to as a "broadcast signal transmission apparatus for MIMO") according to an embodiment of the present invention.

Referring to FIG. 14, the broadcast signal transmission apparatus for MIMO according to the embodiment of the present invention includes a core-layer BICM unit 1410, a signal duplication unit 1415, an enhanced-layer BICM unit 1420, injection level controllers 1431 and 1432, combiners 1441 and 1442, power normalizers 1451 and 1452, time interleavers 1461 and 1462, frequency interleavers 1471 and 1472, pilot pattern injection units 1481 and 1482, predistortion units 1491 and 1492, and RF signal generation units 1417 and 1418.

Details related to the core-layer BICM unit 1410, the injection level controllers 1431 and 1432, the combiners 1441 and 1442, the power normalizers 1451 and 1452, the time interleavers 1461 and 1462, the frequency interleavers 1471 and 1472, and the pilot pattern injection units 1481 and 1482, which are illustrated in FIG. 14, are disclosed in Korean Patent Application Publication No. 2017-0009737 and elsewhere.

The enhanced-layer BICM unit 1420 illustrated in FIG. 14 is configured by applying MIMO to an enhanced layer, wherein a channel-coded and bit-interleaved bit stream is divided into two sub-streams by a MIMO demultiplexer (MIMO DEMUX), and modulation is applied to each of the sub-streams. The modulated signals are combined through a MIMO precoder (i.e. EL MIMO precoder), and a combined signal is divided into two signals for two antennas. Details related to this MIMO scheme are disclosed in Korean Patent Application Publication No. 2016-0084832 and elsewhere.

The example illustrated in FIG. 14 shows the case where plain MISO or MISO TDCFS is applied to the core layer and MIMO Spatial Multiplexing (SM) is applied to the enhanced layer. Here, a horizontal polarization antenna transmits an LDM signal of $x_H = C_H \cdot (CL + EL_H)$ (for plain MISO, $C_H = 1$), and a vertical polarization antenna transmits an LDM signal of $x_V = C_V \cdot (CL + EL_V)$ (for plain MISO, $C_V = 1$).

The core-layer BICM unit 1410 performs channel coding, bit interleaving, and modulation on input data.

In addition to the operation such as that of the core-layer BICM unit 1410, the enhanced-layer BICM unit 1420 includes a MIMO demultiplexer (MIMO DEMUX) and is then configured to divide a channel-coded and bit-interleaved bit stream into two sub-streams and individually modulate the sub-streams. Here, the modulation of the sub-streams may be performed using two modulators, or may be performed using a single shared modulator. Also, the enhanced-layer BICM unit 1420 may combine modulated signals through a MIMO precoder (i.e. EL MIMO PRECODER), and may divide a combined signal into two signals for two antennas.

That is, the, enhanced-layer BICM unit 1420 generates a first enhanced-layer signal and a second enhanced-layer signal by dividing an enhanced-layer data stream into two different enhanced layer sub-streams and by performing MIMO precoding corresponding to the enhanced layer sub-streams.

The injection level controllers 1431 and 1432 generate power-reduced enhanced-layer signals $EL_H$ and $EL_V$ by reducing the powers of the two divided signals. At this time, the strengths of signals controlled by the injection level controllers 1431 and 1432 may be determined depending on the injection levels.

The signal duplication unit 1415 outputs two identical core-layer signals by duplicating an input core-layer signal.

Each of the combiners 1441 and 1442 generates a multiplexed signal by combining the core-layer signal with the corresponding enhanced-layer signal at different power levels. In detail, the combiner 1441 combines the core-layer signal with the enhanced-layer signal $EL_H$, and the combiner 1442 combines the core-layer signal with the enhanced-layer signal $EL_V$.

Each of the power normalizers 1451 and 1452 generates a power-normalized signal by reducing the power of the corresponding multiplexed signal to a level corresponding to the core-layer signal.

Each of the time interleavers 1461 and 1462 generates a time-interleaved signal by time-interleaving the corresponding power-normalized signal.

Each of the frequency interleavers 1471 and 1472 generates a frequency-interleaved signal by frequency-interleaving the corresponding time-interleaved signal.

Each of the pilot pattern injection units 1481 and 1482 injects a pilot pattern into the corresponding frequency-interleaved signal. Here, the pilot pattern injection units 1481 and 1482 may inject different pilot patterns.

In FIG. 14, the outputs of the pilot pattern injection units 1481 and 1482 may be data corresponding to an i-th subcarrier (layered division multiplexed data), and may be the target of transmitting antenna processing.

The predistortion units 1491 and 1492 reduce the correlation (i.e. decorrelate) between signals corresponding to the two antennas by predistorting respective pieces of data. Here, the predistortion units 1491 and 1492 may perform predistortion processing using a Transmit Diversity Code Filter Set (TDCFS).

In the example illustrated in FIG. 14, the predistortion units 1491 and 1492 may be considered to perform transmitting antenna processing described in the accompanying claims.

The RF signal generation units 1417 and 1418 generate RF transmission signals to be transmitted through the corresponding antennas using the predistorted (i.e. transmitting antenna-processed) signals, respectively.

Here, the RF transmission signals generated by the RF signal generation units 1417 and 1418 may be generated based on transmitting antenna processing corresponding to the antennas.

The two antennas illustrated in FIG. 14 may be provided in a single transmission apparatus.

Figure 15:
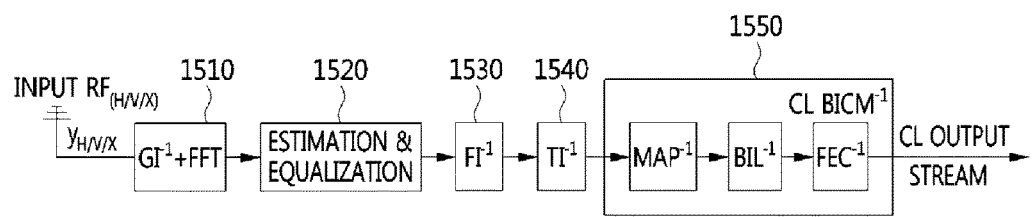
FIG. 15 is a block diagram illustrating a mobile apparatus for receiving a broadcast signal for MIMO according to an embodiment of the present invention.

FIG. 15 is a block diagram illustrating a mobile apparatus for receiving a broadcast signal for MIMO (hereinafter also referred to as a "mobile broadcast signal reception apparatus for MIMO") according to an embodiment of the present invention.

Referring to FIG. 15, the mobile broadcast signal reception apparatus for MIMO according to the embodiment of the present invention includes an RF reception unit 1510, an estimation and equalization unit 1520, a frequency deinterleaver 1530, a time deinterleaver 1540, and a core-layer BICM decoder 1550.

The mobile broadcast signal reception apparatus for MIMO, illustrated in FIG. 15, may restore only a core layer (CL) signal without restoring an enhanced-layer signal even when a layered division multiplexed (LDM)-broadcast signal is transmitted.

The RF reception unit 1510 generates a received signal by receiving signals that have been transmitted through two antennas.

The estimation and equalization unit 1520 performs channel estimation and equalization. Here, the estimation and equalization unit may regard a predistortion performed by the transmission apparatus as part of a channel, and may compensate for the predistortion in the equalization process.

The frequency deinterleaver 1530 performs deinterleaving in the frequency domain, and the time interleaver 1540 performs deinterleaving in the time domain.

The core-layer BICM decoder 1550 may perform the inverse of the process performed by the core-layer BICM unit of the transmission apparatus. Details related to the core-layer BICM decoder 1550 are disclosed in Korean Patent Application Publication No. 2017-0009737 and elsewhere.

The example illustrated in FIG. 15 shows the case where plain MISO or MISO TDCFS is applied to the core layer and MIMO Spatial Multiplexing (SM) is applied to the enhanced layer. Here, the polarization of the receiving antenna may not influence reception performance.

Figure 16:
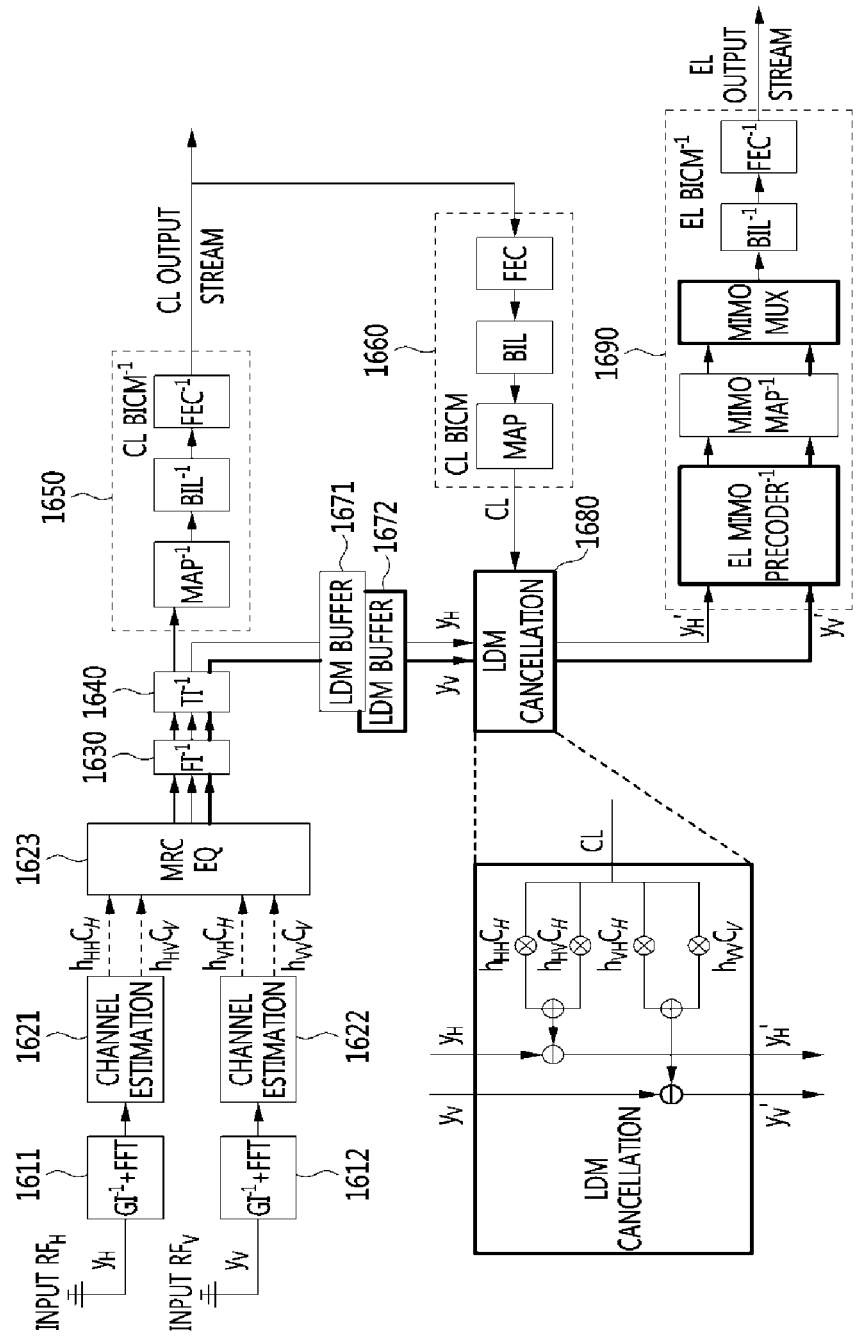
FIG. 16 is a block diagram illustrating a fixed apparatus for receiving a broadcast signal for MIMO according to an embodiment of the present invention.

FIG. 16 is a block diagram illustrating a fixed apparatus for receiving a broadcast signal for MIMO (hereinafter also referred to as a "fixed broadcast signal reception apparatus for MIMO") according to an embodiment of the present invention.

Referring to FIG. 16, the fixed broadcast signal reception apparatus for MIMO according to the embodiment of the present invention includes RF reception units 1611 and 1612, channel estimation units 1621 and 1622, an MRC combining unit 1623, a frequency deinterleaver 1630, a time deinterleaver 1640, a core-layer BICM decoder 1650, a core-layer BICM unit 1660, LDM buffers 1671 and 1672, an LDM cancellation unit 1680, and an enhanced-layer BICM decoder 1690.

The fixed broadcast signal reception apparatus for MIMO illustrated in FIG. 16 may receive layered division multiplexed (LDM)-broadcast signals, and may restore a core-layer signal and an enhanced-layer signal from the LDM broadcast signals.

The example illustrated in FIG. 16 shows the case where plain MISO or MISO TDCFS is applied to the core layer and MIMO Spatial Multiplexing (SM) is applied to the enhanced layer.

The RF reception units 1611 and 1612 generate received signals by receiving signals that have been transmitted through two respective antennas.

The channel estimation units 1621 and 1622 estimate channels between receiving antennas and transmitting antennas. In this case, the channel estimation units 1621 and 1622 may estimate channels by regarding predistortion performed by the transmission apparatus as part of the channels.

The MRC combining unit 1623 is configured to obtain array gain based on the estimated channels, and the detailed operation of the MRC combining unit 1623 will be described later with reference to Equation (12).

The frequency deinterleaver 1630 performs deinterleaving in the frequency domain, and the time deinterleaver 1640 performs deinterleaving in the time domain.

The core-layer BICM decoder 1650 performs the inverse of the process performed by the core-layer BICM unit of the transmission apparatus.

The core-layer BICM unit 1660 may again perform BICM on a restored core-layer stream. Cancellation corresponding to the core layer is performed by the two LDM buffers 1671 and 1672 and the LDM cancellation unit 1680. The signal on which cancellation corresponding to the core layer is performed is restored into an enhanced layer output stream by the enhanced-layer BICM decoder 1690.

Such cancellation may correspond to the core-layer signal, and may be separately performed for individual receiving antennas.

Here, the core layer cancellation process requires a combination of the core layer with the corresponding channel coefficients. That is, the cancellation process is configured to generate a cancellation signal $y_H'$ by subtracting a core layer-channel component combination, corresponding to channels $h_{HH}C_H$ and $h_{HV}C_V$ that are related to the receiving antenna $RF_H$ of the receiving antennas $RF_H$ and $RF_V$, from the buffered signal of the LDM buffer 1671 corresponding to the receiving antenna $RF_H$, and to generate a cancellation signal $y_V'$ by subtracting a core layer-channel component combination, corresponding to channels $h_{VH}C_H$ and $h_{VV}C_V$ that are related to the receiving antenna $RF_V$ of the receiving antennas $RF_H$ and $RF_V$, from the buffered signal of the LDM buffer 1672 corresponding to the receiving antenna $RF_V$.

In this case, the enhanced-layer BICM decoder 1690 may restore the enhanced-layer signal using both the cancelation signals $y_H'$ and $y_V'$.

The enhanced-layer BICM decoder 1690 generates an enhanced-layer signal by performing MIMO decoding using both the cancellation signals $y_H'$ and $y_V'$, demodulating the results of the MIMO decoding using a MIMO demapper (MIMO MAP$^{-1}$), MIMO-multiplexing the demodulated results into a single resulting stream, and performing bit deinterleaving and forward error correction (FEC) decoding on the resulting stream.

Here, the MIMO demapper (MIMO MAP$^{-1}$) may correspond to a modulator in the enhanced-layer BICM unit of the transmission apparatus.

The restoration of the enhanced-layer signal performed through the core-layer BICM decoder 1650, the enhanced-layer BICM decoder 1690, and cancellation corresponding to the core layer is disclosed in detail in Korean Patent Application Publication No. 2017-0009737 and elsewhere.

Although not explicitly illustrated in FIGS. 15 and 16, a power denormalizer for performing the inverse of the function performed by the power normalizer may also be provided upstream of the core-layer BICM decoder.

The received signal, which has been transmitted through the transmission apparatus illustrated in FIG. 14 and is received through the reception apparatus of FIG. 15, is represented by the following Equation (10):

$$y_i = (h_{H,i} \cdot C_H[i] + h_{V,i} \cdot C_V[i]) \cdot CL_i + (h_{H,i} \cdot C_H[i] \cdot EL_{H,i} + h_{V,i} \cdot C_V[i] \cdot EL_{V,i}) + n_i \quad (10)$$

where i denotes a subcarrier index, h denotes a channel, $C_H[i]$ and $C_V[i]$ denote TDCFS coding filter sets, and n denotes noise. In the case of plain MISO, $C_H[i]$ and $C_V[i]$ are '1'.

The channel estimator of each of the reception apparatuses illustrated in FIGS. 15 and 16 provides a combination of the two channels with their corresponding filtering as a unique channel frequency response.

The received signals, which have been transmitted through the transmission apparatus illustrated in FIG. 14 and are received through the reception apparatus of FIG. 16, are represented by the following Equation (11):

$$y_{H,i} = (h_{HH,i} \cdot C_H[i] + h_{HV,i} \cdot C_V[i]) \cdot CL_i + (h_{HH,i} \cdot C_H[i] \cdot EL_{H,i} + h_{HV,i} \cdot C_V[i] \cdot EL_{V,i}) + n_i$$

$$y_{V,i} = (h_{VH,i} \cdot C_H[i] + h_{VV,i} \cdot C_V[i]) \cdot CL_i (h_{VH,i} \cdot C_H[i] \cdot EL_{H,i} + h_{VV,i} \cdot C_V[i] \cdot EL_{V,i}) + n_i \quad (11)$$

where i denotes a subcarrier index, h denotes a channel, $C_H[i]$ and $C_V[i]$ denote TDCFS coding filter sets, and n denotes noise. In the case of plain MISO, $C_H[i]$ and $C_V[i]$ are '1'.

Since there are two receiving antennas, the core layer may exploit array gain through the MRC combining process given by the following Equation (12):

$$CL_i = \frac{y_{H,i} \cdot (h_{HH,i} \cdot C_H[i] + h_{HV,i} \cdot C_V[i])^* + y_{V,i} \cdot (h_{VH,i} \cdot C_H[i] + h_{VV,i} \cdot C_V[i])^*}{|h_{HH,i} \cdot C_H[i] + h_{HV,i} \cdot C_V[i]|^2 + |h_{VH,i} \cdot C_H[i] + h_{VV,i} \cdot C_V[i]|^2} \quad (12)$$

For the cancellation process, re-encoded core layer symbols should be combined and cancelled from $y_H$ and $y_V$, as represented by the following Equation (13):

$$y_{H,i}' = y_{H,i} - h_{HH,i} \cdot C_H[i] \cdot CL_i - h_{HV,i} \cdot C_V[i] \cdot CL_i$$

$$y_{V,i}' = y_{V,i} - h_{VH,i} \cdot C_H[i] \cdot CL_i - h_{VV,i} \cdot C_V[i] \cdot CL_i \quad (13)$$

After the core layer symbols have been cancelled, received symbols are represented by the following Equation (14):

$$y_{H,i}' = h_{HH,i} \cdot C_H[i] \cdot EL_{H,i} + h_{HV,i} \cdot C_V[i] \cdot EL_{V,i} + n_i$$

$$y_{V,i}' = h_{VH,i} \cdot C_H[i] \cdot EL_{H,i} + h_{VV,i} \cdot C_V[i] \cdot EL_{V,i} + n_i \quad (14)$$

Finally, as in the MIMO SM system, enhanced-layer signals $EL_H$ and $EL_V$ may be demodulated.

Figure 17:
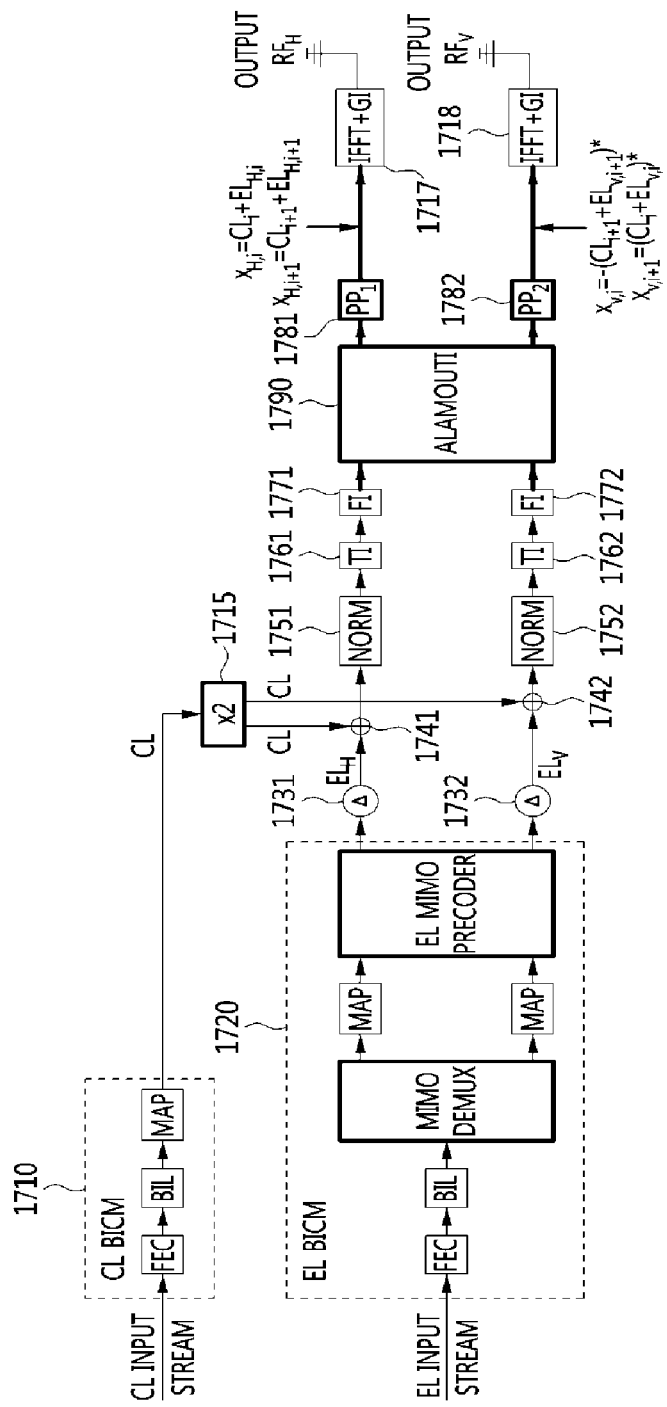
FIG. 17 is a block diagram illustrating an apparatus for transmitting a broadcast signal for MIMO according to another embodiment of the present invention.

FIG. 17 is a block diagram illustrating an apparatus for transmitting a broadcast signal for MIMO according to another embodiment of the present invention.

Referring to FIG. 17, the broadcast signal transmission apparatus for MIMO according to the embodiment of the present invention includes a core-layer BICM unit 1710, a signal duplication unit 1715, an enhanced-layer BICM unit 1720, injection level controllers 1731 and 1732, combiners 1741 and 1742, power normalizers 1751 and 1752, time interleavers 1761 and 1762, frequency interleavers 1771 and 1772, an Alamouti encoder 1790, pilot pattern injection units 1781 and 1782, and RF signal generation units 1717 and 1718.

The core-layer BICM unit 1710, the signal duplication unit 1715, the enhanced-layer BICM unit 1720, the injection level controllers 1731 and 1732, the combiners 1741 and 1742, the power normalizers 1751 and 1752, the time interleavers 1761 and 1762, and the frequency interleavers 1771 and 1772, which are illustrated in FIG. 17, have been described above with reference to FIG. 4.

The example illustrated in FIG. 17 shows the case where a MISO Alamouti scheme is applied to the core layer and a MIMO Spatial Multiplexing (SM) scheme is applied to the enhanced layer. Here, a horizontal polarization antenna transmits an LDM signal of $CL+EL_H$ without any modification, and a vertical polarization antenna conjugates and pairwise-interleaves the cells of an LDM signal of $CL+EL_V$ according to Alamouti encoding.

The Alamouti encoder 1790 divides signals to be transmitted through two antennas into two groups, outputs signals (first group), which are to be transmitted through the horizontal polarization antenna, without any modification, and modifies signals (second group), which are to be transmitted through the vertical polarization antenna, into two QAM symbol blocks in order to maintain orthogonality between the groups.

The pilot pattern injection units 1781 and 1782 inject pilot patterns into respective Alamouti-encoded signals. Here, the pilot pattern injection units 1781 and 1782 may inject different pilot patterns, and may inject more pilot patterns through a structure that is more complicated than that of the pilot pattern injection units illustrated in FIG. 14.

The Alamouti encoder 1790 and the pilot pattern injection units 1781 and 1782, illustrated in FIG. 17, may perform transmitting antenna processing. That is, the Alamouti encoder 1790 may perform Alamouti encoding for reducing the correlation between the signal corresponding to the horizontal polarization antenna and the signal corresponding to the vertical polarization antenna, and the pilot pattern injection units 1781 and 1782 may inject pilot patterns into respective group signals, thus performing transmitting antenna processing. Here, Alamouti encoding may be intended to maintain orthogonality between the signal corresponding to the horizontal polarization antenna and the signal corresponding to the vertical polarization antenna.

The RF signal generation unit 1717 generates an RF transmission signal, which corresponds to the signal multiplexed by the combiner 1741 and is to be transmitted through the horizontal polarization antenna. The RF signal generation unit 1718 generates an RF transmission signal, which corresponds to the signal multiplexed by the combiner 1742 and is to be transmitted through the vertical polarization antenna. At this time, the RF transmission signals may be generated based on transmitting antenna processing corresponding to the antennas.

The two antennas illustrated in FIG. 17 may be provided in a single transmission apparatus.

Figure 18:
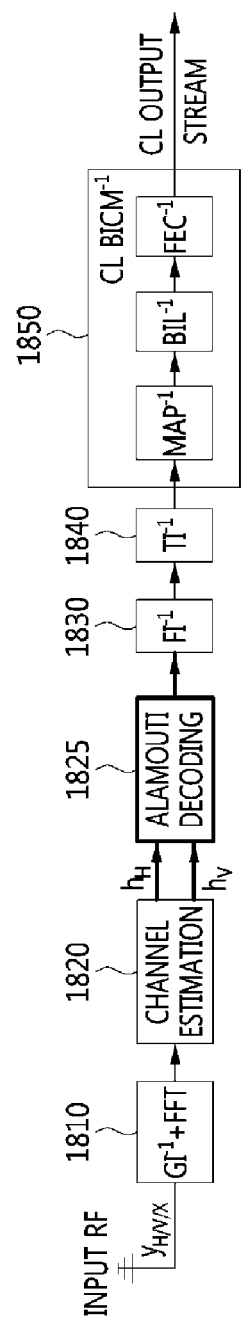
FIG. 18 is a block diagram illustrating a mobile apparatus for receiving a broadcast signal for MIMO according to another embodiment of the present invention.

FIG. 18 is a block diagram illustrating a mobile apparatus for receiving a broadcast signal for MIMO according to another embodiment of the present invention.

Referring to FIG. 18, the mobile broadcast signal reception apparatus for MIMO according to the embodiment of the present invention includes an RF reception unit 1810, a channel estimation unit 1820, an Alamouti decoder 1825, a frequency deinterleaver 1830, a time deinterleaver 1840, and a core-layer BICM decoder 1850.

The mobile broadcast signal reception apparatus for MIMO, illustrated in FIG. 18, may restore only a core-layer signal without restoring an enhanced-layer signal even when an LDM-broadcast signal is transmitted.

The RF reception unit 1810 generates a received signal by receiving signals that have been transmitted through two antennas.

The channel estimation unit 1820 estimates Channel Frequency Responses (CFR) for both channels from the two transmitting antennas. For this, the transmission apparatus may use orthogonal pilot patterns between the two antennas.

The Alamouti decoder 1825 performs a decoding operation corresponding to the Alamouti encoding of the transmission apparatus. The operation of the Alamouti decoder 1825 will be described later with reference to Equation (16).

Here, the Alamouti decoder 1825 may perform Alamouti decoding based on channel estimation on both channels corresponding to the two transmitting antennas.

The frequency deinterleaver 1830 performs deinterleaving in the frequency domain, and the time deinterleaver 1840 performs deinterleaving in the time domain.

The core-layer BICM decoder 1850 performs the inverse of the process performed by the core-layer BICM unit of the transmission apparatus.

Figure 19:
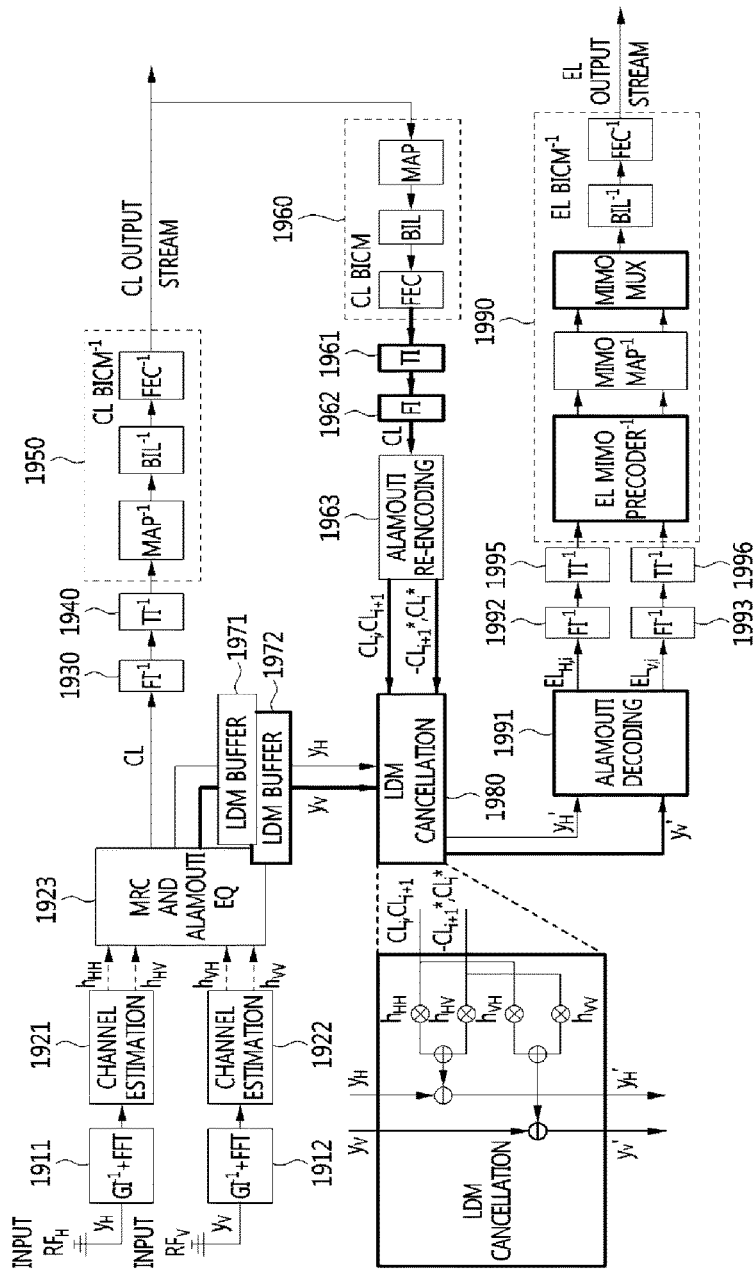
FIG. 19 is a block diagram illustrating a fixed apparatus for receiving a broadcast signal for MIMO according to another embodiment of the present invention.

FIG. 19 is a block diagram illustrating a fixed apparatus for receiving a broadcast signal for MIMO according to a further embodiment of the present invention.

Referring to FIG. 19, the fixed broadcast signal reception apparatus for MIMO according to the further embodiment of the present invention includes RF reception units 1911 and 1912, channel estimation units 1921 and 1922, an MRC and Alamouti decoding unit 1923, a frequency deinterleaver 1930, a time deinterleaver 1940, a core-layer BICM decoder 1950, a core-layer BICM unit 1960, a time interleaver 1961, a frequency interleaver 1962, an Alamouti re-encoder 1963, LDM buffers 1971 and 1972, an LDM cancellation unit 1980, an Alamouti decoder 1991, frequency deinterleavers 1992 and 1993, time deinterleavers 1995 and 1996, and an enhanced-layer BICM decoder 1990.

The fixed broadcast signal reception apparatus for MIMO, illustrated in FIG. 19, may restore a core-layer signal and an enhanced-layer signal by receiving layered division multiplexed (LDM) broadcast signals.

The example illustrated in FIG. 19 shows the case where a MISO Alamouti scheme is applied to the core layer and a MIMO SM scheme is applied to the enhanced layer.

The RF reception units 1911 and 1912 generate received signals by receiving signals that have been transmitted through two antennas.

The channel estimation units 1921 and 1922 estimate channels between receiving antennas and transmitting antennas.

The MRC and Alamouti decoding unit 1923 is configured to obtain array gain and diversity gain based on the estimated channels, and the detailed operation of the MRC and Alamouti decoding unit 1923 will be described later with reference to Equation (18).

The frequency deinterleaver 1930 performs deinterleaving in the frequency domain, and the time deinterleaver 1940 performs deinterleaving in the time domain.

The core-layer BICM decoder 1950 performs the inverse of the process performed by the core-layer BICM unit of the transmission apparatus.

The core-layer BICM unit 1960 again performs BICM on a restored core-layer stream. Cancellation corresponding to the core layer is performed by the LDM buffers 1971 and 1972 and the LDM cancellation unit 1980. The signal on which cancellation corresponding to the core layer (CL) is performed is restored into an enhanced layer (EL) output stream by the enhanced-layer BICM decoder 1990.

For cancellation, the signal, which is again bit-interleaved coded modulated (BICM) by the core-layer BICM unit 1960, undergoes time interleaving and frequency interleaving through the time interleaver 1961 and the frequency interleaver 1962. The interleaved signal is again Alamouti-encoded by the Alamouti re-encoding unit 1963, and then the resulting signal is provided to the LDM cancellation unit 1980.

That is, the cancellation process performed by the LDM cancellation unit 1980 requires a combination of Alamouti re-encoding with the corresponding channel coefficients.

Here, such cancellation may correspond to the core-layer signal, and may be separately performed for individual receiving antennas.

That is, the cancellation process may be configured to generate a cancellation signal $y_H'$ by subtracting a core layer-channel component combination, corresponding to channels $h_{HH}$ and $h_{HV}$ that are related to the receiving antenna $RF_H$ of the receiving antennas $RF_H$ and $RF_V$, from the buffered signal of the LDM buffer 1971 corresponding to the receiving antenna $RF_H$, and to generate a cancellation signal $y_V'$ by subtracting a core layer-channel component combination, corresponding to channels $h_{VH}$ and $h_{VV}$ that are related to the receiving antenna $RF_V$ of the receiving antennas $RF_H$ and $RF_V$, from the buffered signal of the LDM buffer 1972 corresponding to the receiving antenna $RF_V$.

In this case, the enhanced-layer BICM decoder 1990 may restore the enhanced-layer signal using both the cancelation signals $y_H'$ and $y_V'$. Here, Alamouti decoding is performed by the Alamouti decoder 1991 using both the cancellation signals $y_H'$ and $y_V'$ after LDM cancellation. The Alamouti-decoded signals are frequency-deinterleaved by the frequency deinterleavers 1992 and 1993, and the frequency-deinterleaved signals are time-deinterleaved by the time deinterleavers 1995 and 1996, after which the resulting deinterleaved signals are provided to the enhanced-layer BICM decoder 1990.

Alamouti decoding performed by the Alamouti decoder 1991 will be described later with reference to Equations (21) and (22).

After Alamouti decoding, frequency deinterleaving, and time deinterleaving have been performed on the cancellation signals $y_H'$ and $y_V'$, the enhanced-layer BICM decoder 1990 generates an enhanced-layer signal by performing MIMO decoding, demodulating the results of the MIMO decoding using a MIMO demapper (MIMO MAP$^{-1}$), MIMO-multiplexing the demodulated results into a single resulting stream, and performing bit deinterleaving and forward error correction (FEC) decoding on the resulting stream.

The MIMO demapper (MIMO MAP$^{-1}$) may correspond to a modulator in the enhanced-layer BICM unit of the transmission apparatus.

Although not explicitly illustrated in FIGS. 18 and 19, a power denormalizer for performing the inverse of the function of the power normalizer may also be provided upstream of the core-layer BICM decoder.

The received signals, which have been transmitted through the transmission apparatus of FIG. 17 and are received through the reception apparatus of FIG. 18, are represented by the following Equation (15):

$$y_i = h_{H,i} \cdot CL_i - h_{V,i} \cdot CL_{i+1}^* + h_{H,i} \cdot EL_{H,i} - h_{V,i} \cdot EL_{V,i+1}^* + n_i$$

$$y_{i+1} = h_{H,i+1} \cdot CL_{i+1} + h_{V,i+1} \cdot CL_i^* + h_{H,i+1} \cdot EL_{H,i+1} + h_{H,i+1} \cdot EL_{V,i+1}^* + n_{i+1} \quad (15)$$

The cells of the enhanced layer are treated as additional noise (i.e. Additive White Gaussian Noise: AWGN). Therefore, the Alamouti decoding process is represented by the following Equation (16):

$$\begin{bmatrix} y_i \\ y_{i+1}^* \end{bmatrix} = \begin{bmatrix} h_{H,i} & -h_{V,i} \\ h_{V,i+1}^* & h_{H,i+1}^* \end{bmatrix} \quad (16)$$

$$\begin{bmatrix} CL_i \\ CL_{i+1}^* \end{bmatrix} + \begin{bmatrix} h_{H,i} \cdot EL_{H,i} - h_{V,i} \cdot EL_{V,i+1}^* + n_i \\ h_{H,i+1}^* \cdot EL_{H,i+1}^* + h_{V,i+1}^* \cdot EL_{V,i} + n_{i+1}^* \end{bmatrix}$$

The received signals, which have been transmitted through the transmission apparatus of FIG. 17 and are received through the reception apparatus of FIG. 19, are represented by the following Equation (17):

$$y_{H,i} = h_{HH,i} \cdot CL_i - h_{HV,i} \cdot CL_{i+1}^* + h_{HH,i} \cdot EL_{H,i} - h_{HV,i} \cdot EL_{V,i+1}^* + n_{H,i}$$

$$y_{H,i+1} = h_{HH,i+1} \cdot CL_{i+1} + h_{HV,i+1} \cdot CL_i^* + h_{HH,i+1} \cdot EL_{H,i+1} + h_{HV,i+1} \cdot EL_{V,i}^* + n_{H,i+1}$$

$$y_{V,i} = h_{VH,i} \cdot CL_i - h_{VV,i} \cdot CL_{i+1}^* + h_{VH,i} \cdot EL_{H,i} - h_{VV,i} \cdot EL_{V,i+1}^* + n_{V,i}$$

$$y_{V,i+1} = h_{VH,i+1} \cdot CL_{i+1} + h_{VV,i+1} \cdot CL_i^* + h_{VH,i+1} \cdot EL_{H,i+1} + h_{VV,i+1} \cdot EL_{V,i}^* + n_{V,i+1} \quad (17)$$

The core layer may exploit array gain based on MRC combining, as given by the following Equation (18):

$$CL_i = \frac{y_{H,i} \cdot h_{HH,i}^* - y_{H,i+1}^* \cdot h_{HV,i+1} + y_{V,i} \cdot h_{VH,i}^* - y_{V,i+1}^* \cdot h_{VV,i+1}}{|h_{HH,i}|^2 + |h_{HV,i+1}|^2 + |h_{VH,i}|^2 + |h_{VV,i+1}|^2}$$

$$CL_{i+1} = \frac{-y_{H,i}^* \cdot h_{HV,i} + y_{H,i+1} \cdot h_{HH,i+1}^* - y_{V,i}^* \cdot h_{VV,i} + y_{V,i+1} \cdot h_{VH,i+1}^*}{|h_{HH,i+1}|^2 + |h_{HV,i}|^2 + |h_{VH,i+1}|^2 + |h_{VV,i}|^2} \quad (18)$$

For the cancellation process, re-encoded core layer symbols should be Alamouti encoded again, combined, and cancelled from $y_H$ and $y_V$, as represented by the following Equation (19):

$$y_{H,i}' = y_{H,i} - h_{HH,i} \cdot CL_i + h_{HV,i} \cdot CL_{i+1}^*$$

$$y_{H,i+1}' = y_{H,i+1} - h_{HH,i+1} \cdot CL_{i+1} - h_{HV,i+1} \cdot CL_i^*$$

$$y_{V,i}' = y_{V,i} - h_{VH,i} \cdot CL_i + h_{VV,i} \cdot CL_{i+1}^*$$

$$y_{V,i+1}' = y_{V,i+1} - h_{VH,i+1} \cdot CL_{i+1} - h_{VV,i+1} \cdot CL_i^* \quad (19)$$

After core layer symbols have been cancelled, the received symbols are represented by the following Equation (20):

$$y_{H,i}' = h_{HH,i} \cdot EL_{H,i} - h_{HV,i} \cdot EL_{V,i+1}^* + n_{H,i}$$

$$y_{H,i+1}' = h_{HH,i+1} \cdot EL_{H,i+1} + h_{HV,i+1} \cdot EL_{V,i}^* + n_{H,i+1}$$

$$y_{V,i}' = h_{VH,i} \cdot EL_{H,i} - h_{VV,i} \cdot EL_{V,i+1}^* + n_{V,i}$$

$$y_{V,i+1}' = h_{VH,i+1} \cdot EL_{H,i+1} + h_{VV,i+1} \cdot EL_{V,i}^* + n_{V,i+1} \quad (20)$$

Next, two separate Alamouti decoding processes are performed, as represented by the following Equations (21) and (22):

$$\begin{bmatrix} y_{H,i}' \\ y_{V,i}' \end{bmatrix} = \begin{bmatrix} h_{HH,i} & -h_{HV,i} \\ h_{VH,i} & -h_{VV,i} \end{bmatrix} \begin{bmatrix} EL_{H,i} \\ EL_{V,i+1}^* \end{bmatrix} + \begin{bmatrix} n_{H,i} \\ n_{V,i} \end{bmatrix} \quad (21)$$

$$\begin{bmatrix} y_{H,i+1}' \\ y_{V,i+1}' \end{bmatrix} = \begin{bmatrix} h_{HH,i+1} & h_{HV,i+1} \\ h_{VH,i+1} & h_{VV,i+1} \end{bmatrix} \begin{bmatrix} EL_{H,i+1} \\ EL_{V,i}^* \end{bmatrix} + \begin{bmatrix} n_{H,i+1} \\ n_{V,i+1} \end{bmatrix} \quad (22)$$

Hereinafter, the case where a mobile reception apparatus is provided with two antennas, as in the case of a fixed reception apparatus, will be described.

First, the case where any of MISO schemes (plain MISO, MISO TDCFS, and MISO Alamouti schemes) is used for a core layer and MIMO SM is used for an enhanced layer will be described.

In this case, the structure of the transmission apparatus is identical to that illustrated in FIG. 14 or 17, and the structure of the fixed reception apparatus is identical to that illustrated in FIG. 16 or 19.

Figure 20:
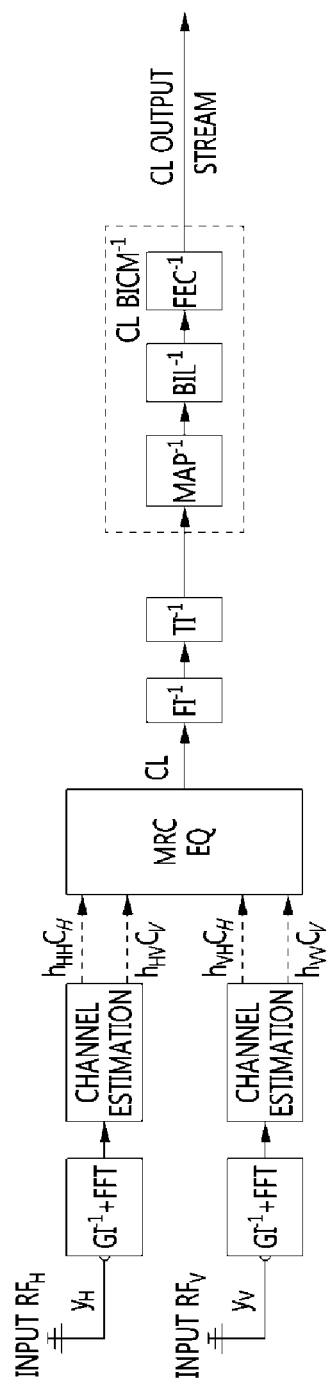
FIG. 20 is a block diagram illustrating a mobile apparatus for receiving a broadcast signal for MIMO according to a further embodiment of the present invention.

FIG. 20 is a block diagram illustrating a mobile apparatus for receiving a broadcast signal for MIMO according to a further embodiment of the present invention.

Referring to FIG. 20, it can be seen that, when a plain MISO or MISO TDCFS scheme is applied to a core layer and a MIMO SM scheme is applied to an enhanced layer, the mobile broadcast signal reception apparatus is provided with two antennas.

In order to exploit SIMO array gain for a core-layer signal, an MRC combining method given in Equation (12) may be applied.

Figure 21:
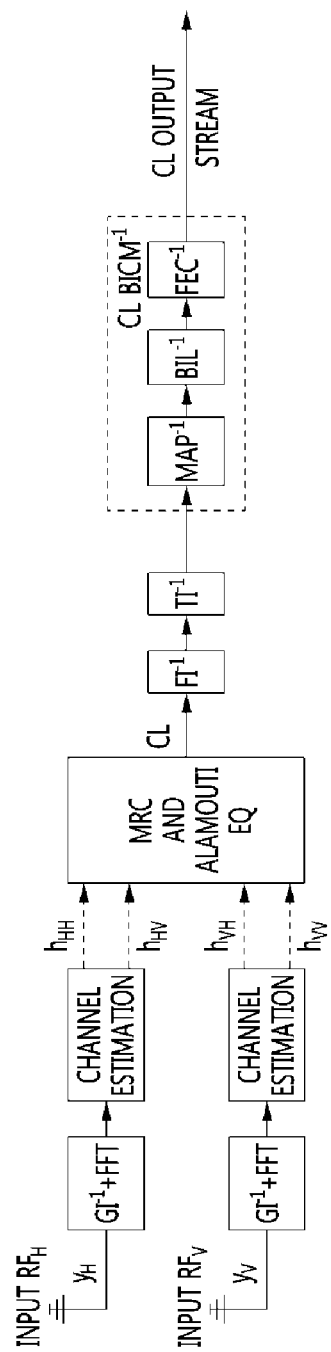
FIG. 21 is a block diagram illustrating a mobile apparatus for receiving a broadcast signal for MIMO according to yet another embodiment of the present invention.

FIG. 21 is a block diagram illustrating a mobile apparatus for receiving a broadcast signal for MIMO according to yet another embodiment of the present invention.

Referring to FIG. 21, it can be seen that, when a MISO Alamouti scheme is applied to a core layer and a MIMO SM scheme is applied to an enhanced layer, the mobile broadcast signal reception apparatus is provided with two antennas.

In order to exploit SIMO array gain for a core-layer signal, an MRC and Alamouti combining method given in Equation (18) may be applied.

The configurations of FIGS. 20 and 21 are parts of those of FIGS. 16 and 19, respectively, and respective components thereof have been described above, and thus repetitive descriptions of detailed operations of those components will be omitted.

The received symbols, which are received by the reception apparatus illustrated in FIG. 20, are represented by Equation (11), and the received symbols, which are received by the reception apparatus illustrated in FIG. 21, are represented by Equation (15). Here, MRC combining may be performed by Equation (12) or (18).

In this case, a fixed reception apparatus may perform the same cancellation process as that of Equation (13) or (19).

Below, the case where MIMO Spatial Multiplexing (SM) is used both for a core layer and for an enhanced layer will be described.

Figure 22:
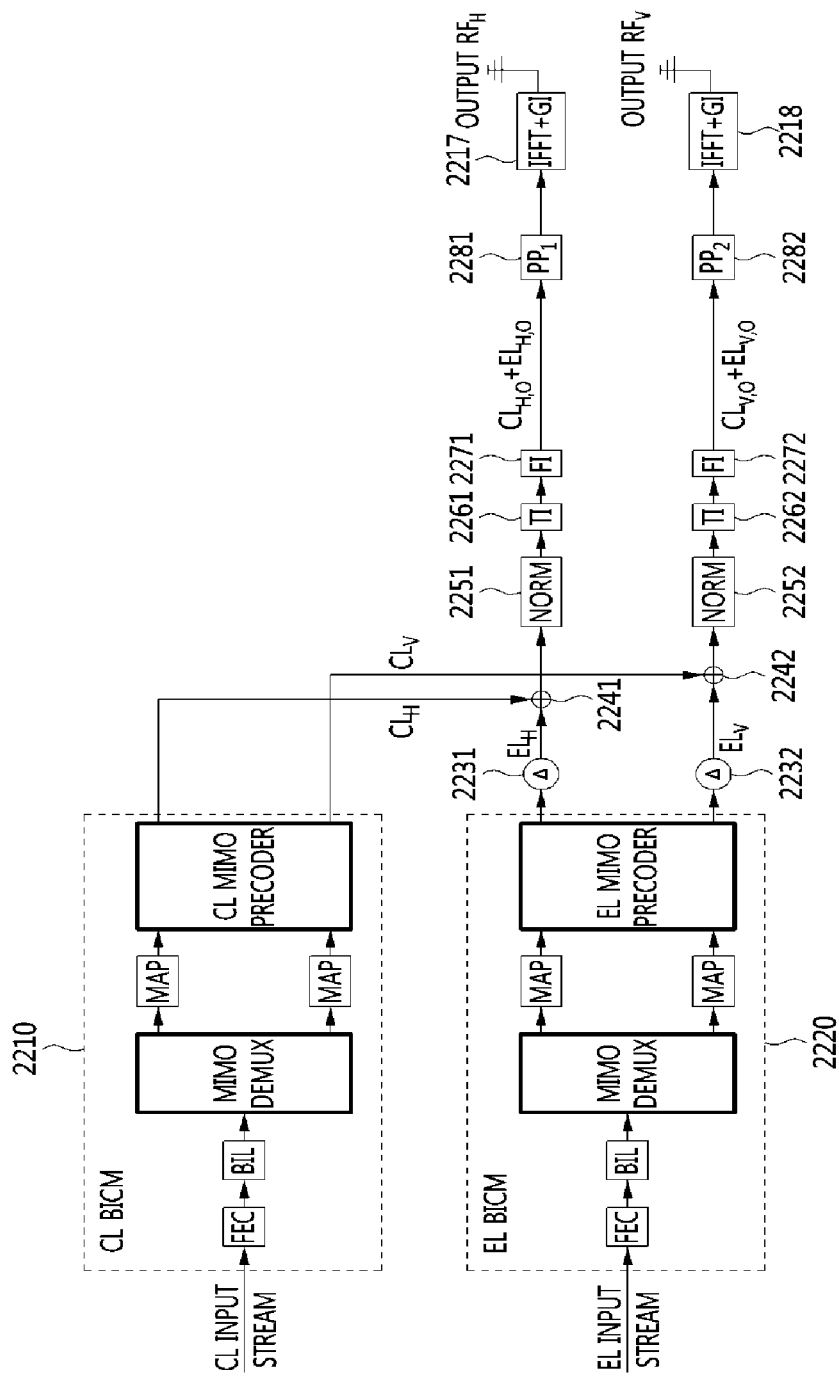
FIG. 22 is a block diagram illustrating an apparatus for transmitting a broadcast signal for MIMO according to a further embodiment of the present invention.

FIG. 22 is a block diagram illustrating an apparatus for transmitting a broadcast signal for MIMO according to a further embodiment of the present invention.

Referring to FIG. 22, the broadcast signal transmission apparatus for MIMO according to the further embodiment of the present invention includes a core-layer BICM unit 2210, an enhanced-layer BICM unit 2220, injection level controllers 2231 and 2232, combiners 2241 and 2242, power normalizers 2251 and 2252, time interleavers 2261 and 2262, frequency interleavers 2271 and 2272, pilot pattern injection units 2281 and 2282, and RF signal generation units 2217 and 2218.

The enhanced-layer BICM unit 2220, the injection level controllers 2231 and 2232, the combiners 2241 and 2242, the power normalizers 2251 and 2252, the time interleavers 2261 and 2262, the frequency interleavers 2271 and 2272, and the RF signal generation units 2217 and 2218, illustrated in FIG. 22, have been described above.

In the example illustrated in FIG. 22, MIMO SM is applied even to the core layer like the enhanced layer. That is, in the same way as the enhanced-layer BICM unit 2220, the core-layer BICM unit 2210 includes a MIMO demultiplexer (MIMO DEMUX), and is then configured to divide a channel-coded and bit-interleaved bit stream into two sub-streams and to individually modulate the sub-streams. Here, the modulation of the sub-streams may be may be performed using two modulators, or may be performed using a single shared modulator. Further, the core-layer BICM unit 2210 may combine the modulated signals through a MIMO pre-coder (i.e. CL MIMO PRECODER), and may divide a combined signal into two signals for two antennas.

That is, the core-layer BICM unit 2210 generates a first core-layer signal and a second core-layer signal by dividing a core-layer data stream into two different core layer sub-streams and by performing MIMO precoding corresponding to the core layer sub-streams.

The pilot pattern injection units 2281 and 2282 inject suitable pilot patterns into an LDM signal for a horizontal antenna and an LDM signal for a vertical antenna. Here, the pilot pattern injection units 2281 and 2282 may inject different pilot patterns.

In the example illustrated in FIG. 22, transmitting antenna processing may be configured to inject suitable pilot patterns into a first LDM signal for the horizontal antenna and a second LDM signal for the vertical antenna, respectively.

The two antennas illustrated in FIG. 22 may be provided in a single transmission apparatus.

Figure 23:
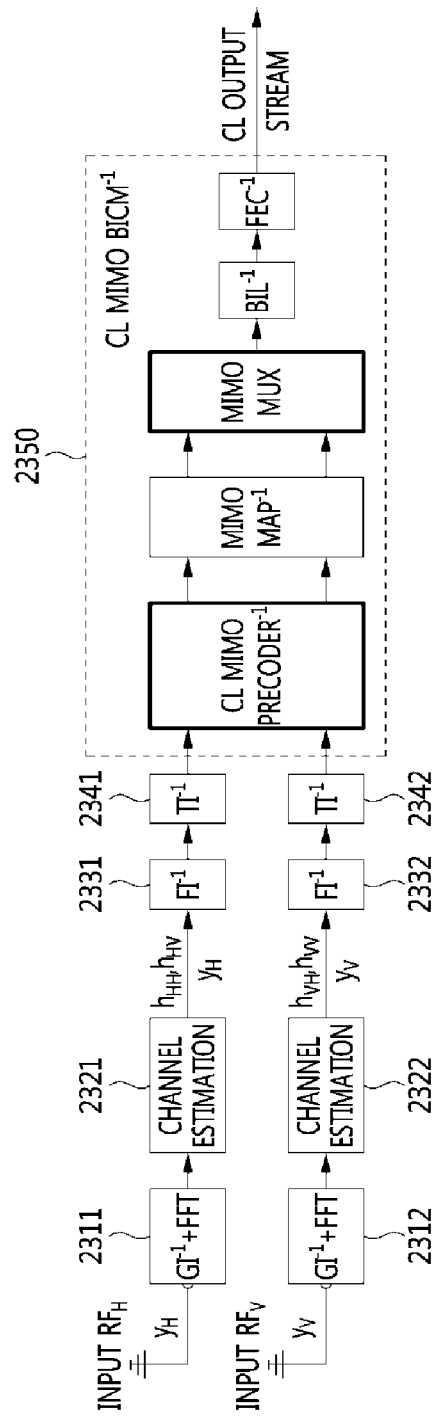
FIG. 23 is a block diagram illustrating a mobile apparatus for receiving a broadcast signal for MIMO according to still another embodiment of the present invention.

FIG. 23 is a block diagram illustrating a mobile apparatus for receiving a broadcast signal for MIMO according to still another embodiment of the present invention.

Referring to FIG. 23, the mobile broadcast signal reception apparatus for MIMO according to still another embodiment of the present invention includes RF reception units 2311 and 2312, channel estimation units 2321 and 2322, frequency deinterleavers 2331 and 2332, time deinterleavers 2341 and 2342, and a core-layer BICM decoder 2350.

Here, the channel estimation unit 2321 may estimate channels related to a horizontal polarization antenna, and the channel estimation unit 2322 may estimate channels related to a vertical polarization antenna. The related channels may include cross channels.

In an example illustrated in FIG. 23, the frequency deinterleavers 2331 and 2332 and the time deinterleavers 2341 and 2342 perform frequency and time deinterleaving operations for the horizontal polarization antenna and the vertical polarization antenna, respectively.

Also, in the same way as the enhanced-layer BICM decoder illustrated in FIGS. 16 and 19, the core-layer BICM decoder 2350 generates a core-layer signal by performing MIMO decoding based on two antenna signals, demodulating the results of MIMO decoding using a MIMO demapper (MIMO MAP$^{-1}$), MIMO-multiplexing the demodulated results into a single resulting stream, and performing bit deinterleaving and FEC decoding on the resulting stream.

That is, the example illustrated in FIG. 23 requires a second reception chain and a more complicated MIMO demapper for core layer MIMO.

Figure 24:
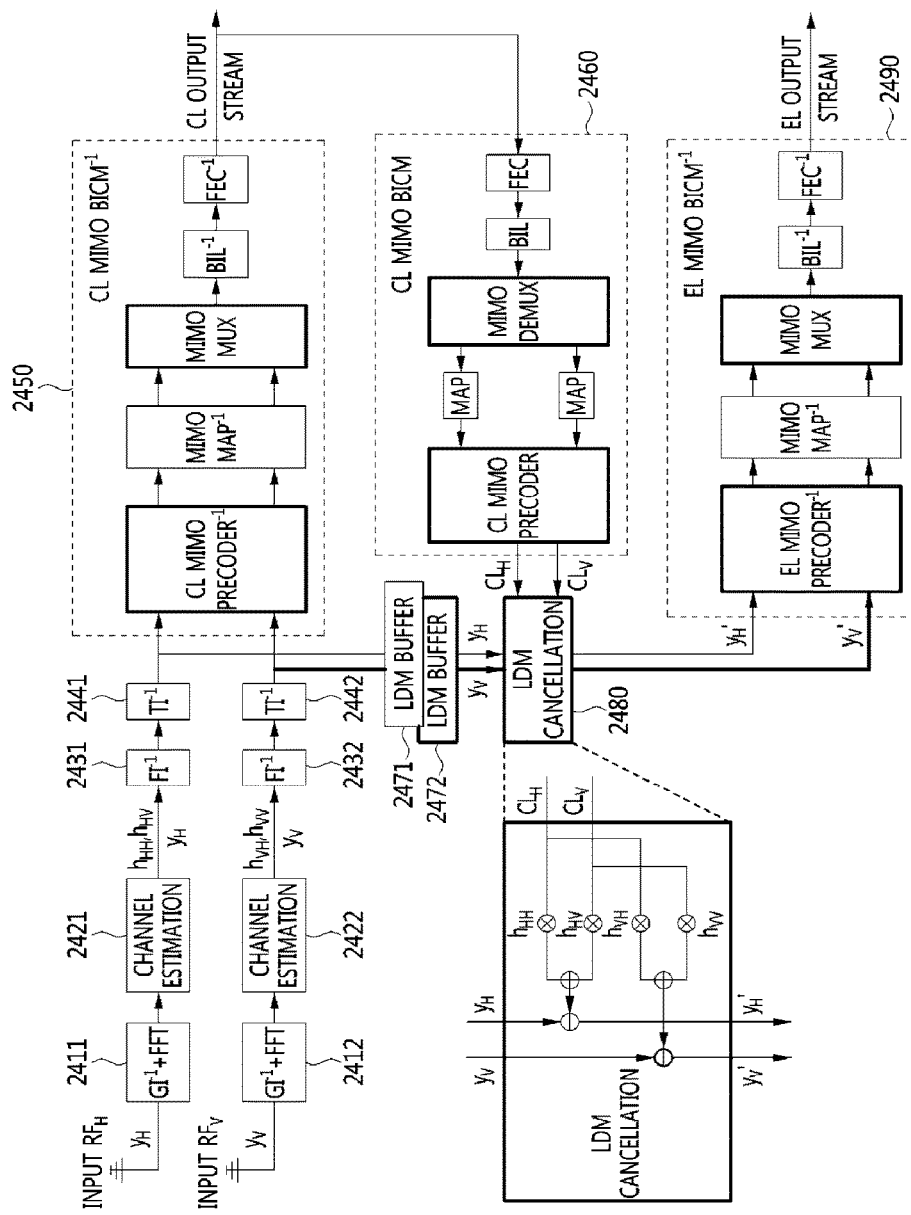
FIG. 24 is a block diagram illustrating a fixed apparatus for receiving a broadcast signal for MIMO according to a further embodiment of the present invention.

FIG. 24 is a block diagram illustrating a fixed apparatus for receiving a broadcast signal for MIMO according to a further embodiment of the present invention.

Referring to FIG. 24, the fixed broadcast signal reception apparatus for MIMO according to the further embodiment of the present invention includes RF reception units 2411 and 2412, channel estimation units 2421 and 2422, frequency deinterleavers 2431 and 2432, time deinterleavers 2441 and 2442, a core-layer BICM decoder 2450, a core-layer BICM unit 2460, LDM buffers 2471 and 2472, an LDM cancellation unit 2480, and an enhanced-layer BICM decoder 2490.

The fixed broadcast signal reception apparatus for MIMO, illustrated in FIG. 24, may receive layered division multiplexed (LDM) broadcast signals, and may restore a core-layer signal and an enhanced-layer signal from the broadcast signals.

The example illustrated in FIG. 24 illustrates the case where MIMO SM is applied both to the core layer and to the enhanced layer.

The RF reception units 2411 and 2412 generate received signals by receiving the signals that have been transmitted through two antennas.

The channel estimation units 2421 and 2422 estimate channels between receiving antennas and transmitting antennas.

In the example illustrated in FIG. 24, the frequency deinterleavers 2431 and 2432 and the time deinterleavers 2441 and 2442 perform frequency and time deinterleaving operations for a horizontal polarization antenna and a vertical polarization antenna, respectively.

The core-layer BICM decoder 2450 performs the inverse of the process performed by the core-layer BICM unit of the transmission apparatus.

In the example illustrated in FIG. 24, in the same way as the enhanced-layer BICM decoders illustrated in FIGS. 16 and 19, the core-layer BICM decoder 2450 generates a core-layer signal by performing MIMO decoding based on two antenna signals, demodulating the results of MIMO decoding using a MIMO demapper (MIMO MAP$^{-1}$), MIMO-multiplexing the demodulated results into a single resulting stream, and performing bit deinterleaving and FEC decoding on the resulting stream.

The core-layer BICM unit 2460 again performs BICM on the restored core-layer stream. In detail, the core-layer BICM unit 2460 includes a MIMO demultiplexer (MIMO DEMUX), and is then configured to divide a channel-coded and bit-interleaved bit stream into two sub-streams and individually modulate the sub-streams. Here, the modulation of the sub-streams may be may be performed using two modulators, or may be performed using a single shared modulator. Further, the core-layer BICM unit 2460 may combine the modulated signals through a MIMO precoder (i.e. CL MIMO PRECODER), and may divide a combined signal into two signals for two antennas.

Cancellation corresponding to the core layer is performed through the two LDM buffers 2471 and 2472 and the LDM cancellation unit 2480. The signal on which cancellation corresponding to the core layer is performed is restored into an enhanced layer output stream through the enhanced-layer BICM decoder 2490.

Here, the cancellation process performed by the LDM cancellation unit 2480 requires a MIMO encoder and a combination with the corresponding channel coefficients.

The cancellation process may correspond to the core-layer signal, and may be separately performed for individual receiving antennas.

That is, the cancellation process may be configured to generate a cancellation signal $y_H'$ by subtracting a core layer-channel component combination, corresponding to channels $h_{HH}$ and $h_{HV}$ that are related to the receiving antenna $RF_H$ of the receiving antennas $RF_H$ and $RF_V$, from the buffered signal of the LDM buffer 2471 corresponding to the receiving antenna $RF_H$, and to generate a cancellation signal $y_V'$ by subtracting a core layer-channel component combination, corresponding to channels $h_{VH}$ and $h_{VV}$ that are related to the receiving antenna $RF_V$ of the receiving antennas $RF_H$ and $RF_V$, from the buffered signal of the LDM buffer 2472 corresponding to the receiving antenna $RF_V$.

Here, the enhanced-layer BICM decoder 2490 may restore the enhanced-layer signal using both the cancelation signals $y_H'$ and $y_V'$.

The enhanced-layer BICM decoder 2490 generates an enhanced-layer signal by performing MIMO decoding using both the cancellation signals $y_H'$ and $Y_V'$, demodulating the results of the MIMO decoding using a MIMO demapper (MIMO MAP$^{-1}$), MIMO-multiplexing the demodulated results into a single resulting stream, and performing bit deinterleaving and FEC decoding on the resulting stream.

The MIMO demapper (MIMO MAP$^{-1}$) may correspond to a modulator in the enhanced-layer BICM unit of the transmission apparatus.

Although not explicitly illustrated in FIGS. 23 and 24, a power denormalizer for performing the inverse of the function of the power normalizer may also be provided upstream of the core-layer BICM decoder.

The received signals, which have been transmitted through the transmission apparatus illustrated in FIG. 22 and are received through the reception apparatus of FIG. 23 or 24, are represented by the following Equation (23):

$$\begin{cases} y_{H,i} = (CL_{H,i} + EL_{H,i}) \cdot h_{HH,i} + (CL_{V,i} + EL_{V,i}) \cdot h_{HV,i} + n_{H,i} \\ y_{V,i} = (CL_{H,i} + EL_{H,i}) \cdot h_{VH,i} + (CL_{V,i} + EL_{V,i}) \cdot h_{VV,i} + n_{V,i} \end{cases} \quad (23)$$

The mobile reception apparatus illustrated in FIG. 23 assumes enhanced layer (EL) symbols to be additional noise (i.e. AWGN), and performs MIMO SM demapping on the received symbols in Equation (23).

Core layer symbols, remodulated by the fixed reception apparatus illustrated in FIG. 24, should be combined depending on the MIMO antenna scheme. The required cancellation process is given by the following Equation (24):

$$y_{H,i}' = y_{H,i} - (CL_{H,i} h_{HH,i} + CL_{V,i} h_{HV,i}) = EL_{H,i} h_{HH,i} + EL_{V,i} h_{HV,i} + n_{H,i}$$

$$y_{V,i}' = y_{V,i} - (CL_{H,i} h_{VH,i} + CL_{V,i} h_{VV,i}) = EL_{H,i} h_{VH,i} + EL_{V,i} h_{VV,i} + n_{V,i} \quad (24)$$

Among the MISO techniques used for MIMO, the MISO Alamouti scheme exhibits better performance. However, as described above with reference to FIG. 19, when the MISO Alamouti scheme is applied, a core layer cancellation process becomes complicated. Since Alamouti encoding performs pairwise-cell interleaving at the end of a transmitting chain, time interleaving and frequency interleaving should be performed in a remodulation process.

Therefore, there is required a new technique which enables a core layer cancellation process to be more simply implemented while exhibiting performance similar to that in the case where the Alamouti scheme is used.

Figure 25:
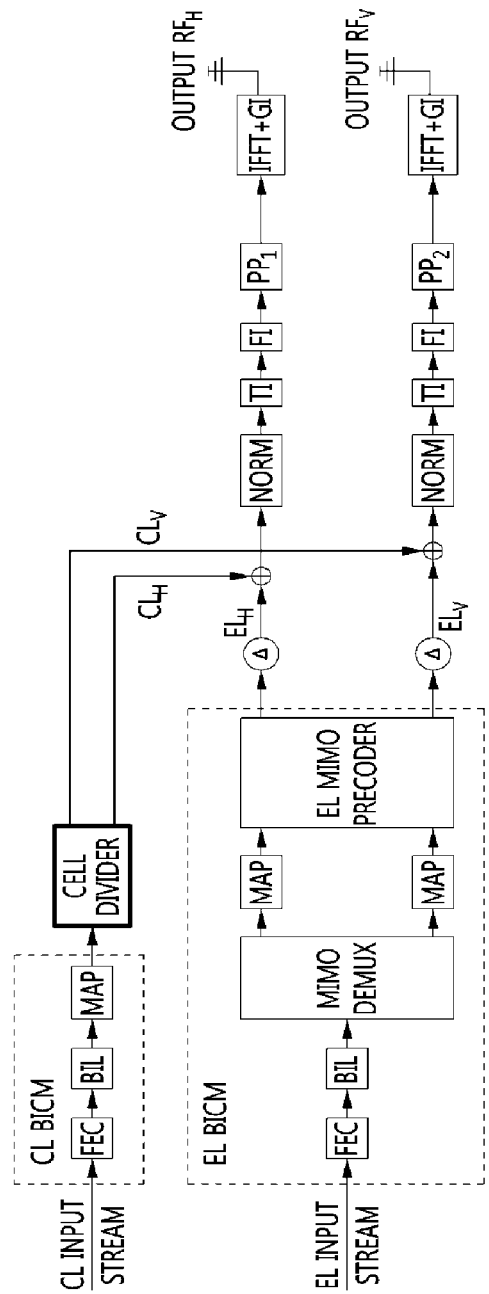
FIG. 25 is a block diagram illustrating an apparatus for transmitting a broadcast signal for MIMO according to yet another embodiment of the present invention.

FIG. 25 is a block diagram illustrating an apparatus for transmitting a broadcast signal for MIMO according to yet another embodiment of the present invention.

Referring to FIG. 25, the broadcast signal transmission apparatus for MIMO according to yet another embodiment of the present invention has a structure similar to that of FIG. 22, but it can be seen that two different core-layer signals are generated by a cell divider.

Here, the cell divider provided downstream of a core-layer BICM unit functions as a cell exchanger. That is, even cells of the core layer are transmitted through a horizontal antenna, and odd cells are transmitted through a vertical antenna. Here, compared to the case of FIG. 17, it can be seen that the coding rate of the core layer is halved.

The example illustrated in FIG. 25 may be regarded as the case where a MISO FEC divider is applied to a core layer and MIMO SM is applied to the enhanced layer. Also, in a transmission chain, neither additional TDCFS predistortion nor Alamouti encoding is performed.

When the transmission apparatus illustrated in FIG. 25 is used, a mobile reception apparatus should use two receiving antennas.

Figure 26:
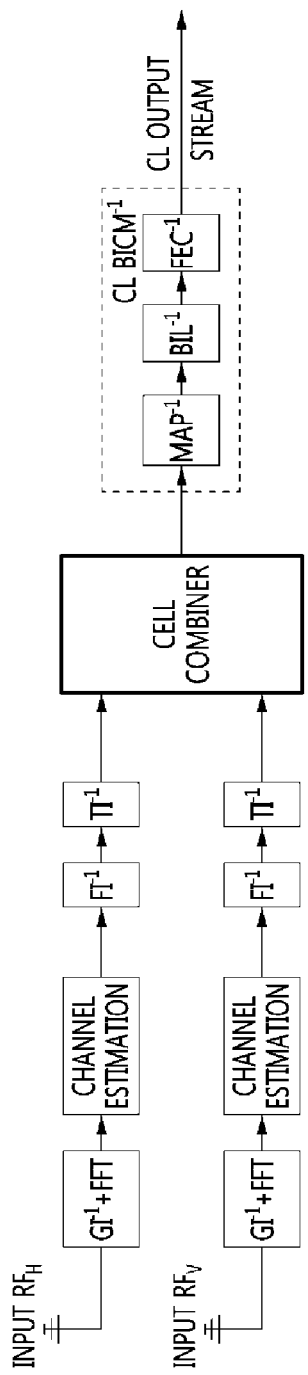
FIG. 26 is a block diagram illustrating a mobile apparatus for receiving a broadcast signal for MIMO according to still another embodiment of the present invention.

FIG. 26 is a block diagram illustrating a mobile apparatus for receiving a broadcast signal for MIMO according to still another embodiment of the present invention.

Referring to FIG. 26, the mobile broadcast signal reception apparatus for MIMO according to still another embodiment of the present invention has a structure similar to that illustrated in FIG. 23, but two signals are combined into a single signal by a cell combiner instead of a MIMO decoding scheme.

Comparing the example illustrated in FIG. 26 with the example illustrated in FIG. 21, it may be considered that a second frequency deinterleaver $FI^{-1}$ and a second time deinterleaver $TI^{-1}$ are additionally required, and thus complexity is increased.

In contrast, in a core layer cancellation process, there is no need to perform time interleaving and frequency interleaving caused by Alamouti interleaving, and thus the complexity of fixed reception apparatuses is decreased.

Figure 27:
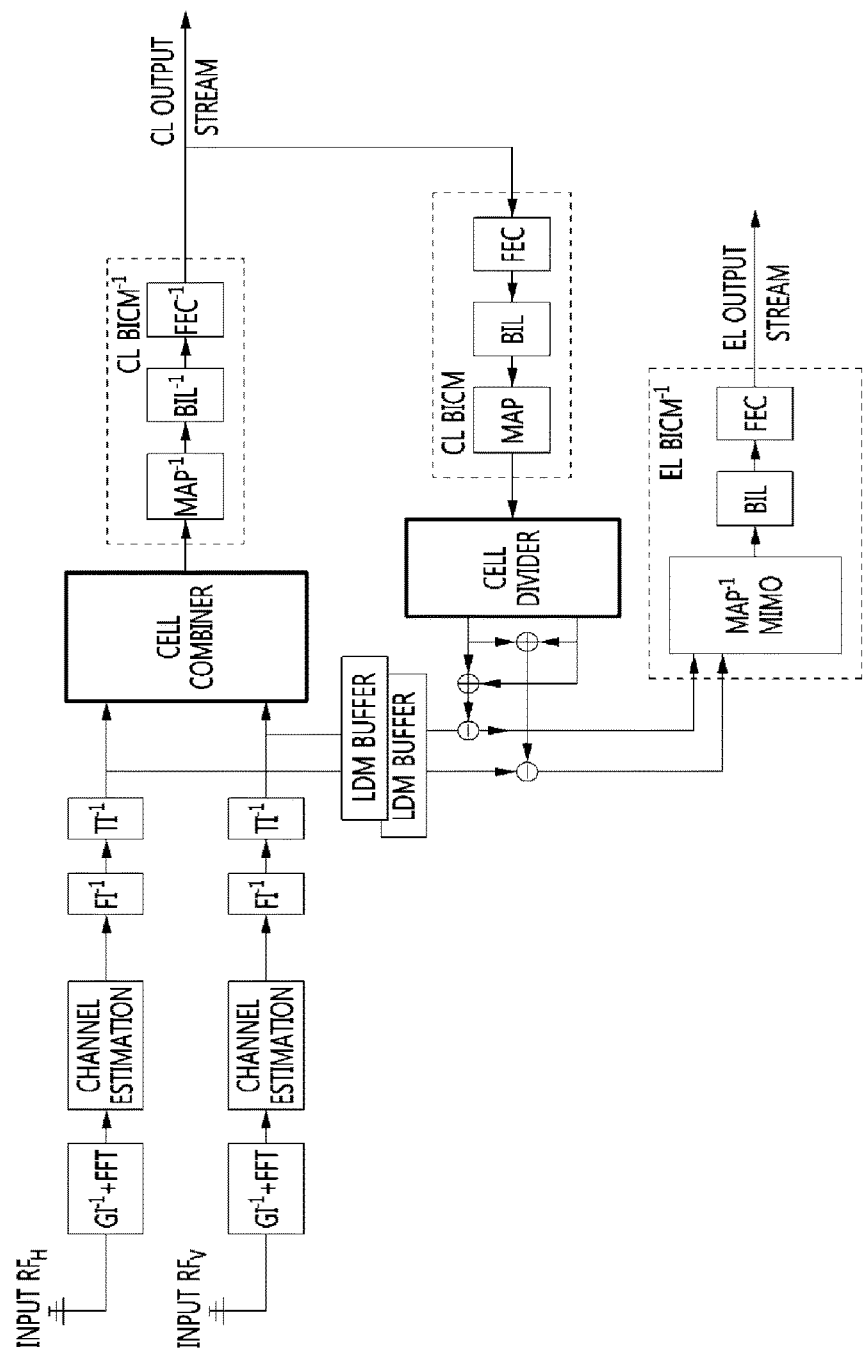
FIG. 27 is a block diagram illustrating a fixed apparatus for receiving a broadcast signal for MIMO according to yet another embodiment of the present invention.

FIG. 27 is a block diagram illustrating a fixed apparatus for receiving a broadcast signal for MIMO according to yet another embodiment of the present invention.

Referring to FIG. 27, it can be seen that the fixed broadcast signal reception apparatus for MIMO according to yet another embodiment of the present invention has a simpler structure than that illustrated in FIG. 19.

The example illustrated in FIG. 27 shows the case where a MISO FEC divider is applied to a core layer and MISO SM is applied to an enhanced layer.

A cell divider in FIG. 27 performs the same operation as the cell divider illustrated in FIG. 25, and the operation of a cell combiner has been described above with reference to FIG. 26.

Received symbols, which have been transmitted through the transmission apparatus illustrated in FIG. 25 and are received through the reception apparatus of FIG. 26 or 27, are represented by the following Equation (25):

$$\begin{cases} y_{H,i} = (CL_i + EL_{H,i}) \cdot h_{HH,i} + (CL_{i+1} + EL_{V,i}) \cdot h_{HV,i} + n_{H,i} \\ y_{V,i} = (CL_i + EL_{H,i}) \cdot h_{VH,i} + (CL_{i+1} + EL_{V,i}) \cdot h_{VV,i} + n_{V,i} \end{cases} \quad (25)$$

where CL denotes a core layer, EL denotes an enhanced layer, i denotes a subcarrier index, h denotes a channel, and n denotes noise.

Figure 28:
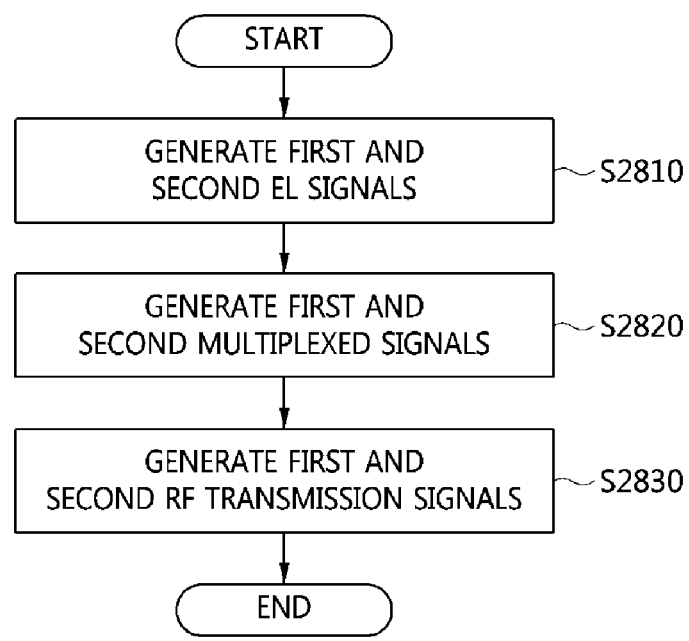
FIG. 28 is an operation flowchart illustrating a method for transmitting a broadcast signal for MIMO according to an embodiment of the present invention.

FIG. 28 is an operation flowchart illustrating a method for transmitting a broadcast signal for MIMO according to an embodiment of the present invention.

Referring to FIG. 28, the broadcast signal transmission method for MIMO according to the embodiment of the present invention generates a first enhanced-layer signal and a second enhanced-layer signal by dividing an enhanced-layer data stream into two different enhanced layer sub-streams and by performing MIMO precoding corresponding to the enhanced layer sub-streams at step S2810.

Next, the broadcast signal transmission method for MIMO according to the embodiment of the present invention generates a first multiplexed signal corresponding to a first antenna by combining a first core-layer signal corresponding to a core-layer data stream with the first enhanced-layer signal at different power levels, and generates a second multiplexed signal corresponding to a second antenna by combining a second core-layer signal corresponding to the core-layer data stream with the second enhanced-layer signal at different power levels at step S2820.

Further, the broadcast signal transmission method for MIMO according to the embodiment of the present invention generates a first RF transmission signal, which corresponds to the first multiplexed signal and is to be transmitted through the first antenna, and a second RF transmission signal, which corresponds to the second multiplexed signal and is to be transmitted through the second antenna, at step S2830.

The first RF transmission signal and the second RF transmission signal may be generated based on transmitting antenna processing corresponding to the first antenna and the second antenna.

The transmitting antenna processing may be predistortion processing using a Transmit Diversity Code Filter Set (TDCFS).

The transmitting antenna processing may be performed after a pilot pattern has been injected into a frequency-interleaved signal.

Here, the transmitting antenna processing may include Alamouti encoding for maintaining orthogonality between the signal corresponding to the first antenna and the signal corresponding to the second antenna.

The transmitting antenna processing may inject pilot patterns into the Alamouti-encoded signal.

In this case, the first core-layer signal and the second core-layer signal may be generated by dividing the core-layer data stream into two different core layer sub-streams and performing MIMO precoding corresponding to the core layer sub-streams.

Figure 29:
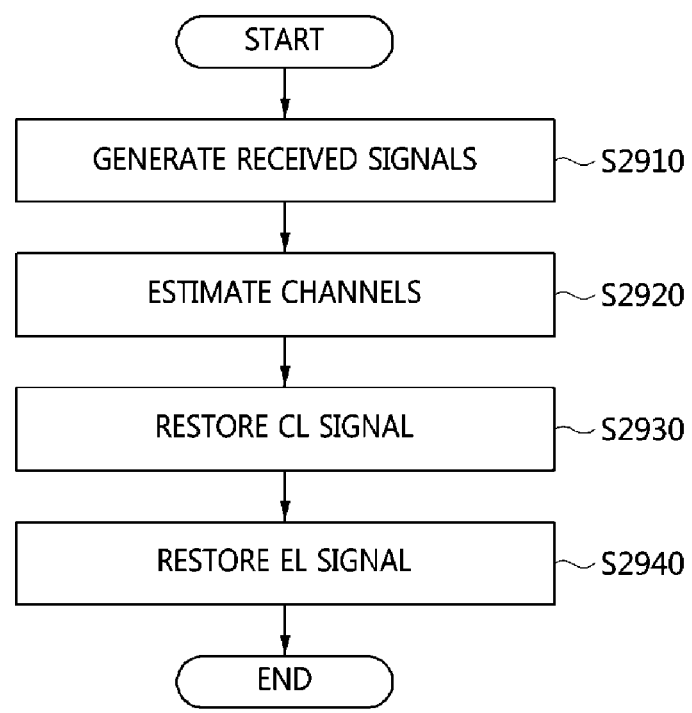
FIG. 29 is an operation flowchart illustrating a method for receiving a broadcast signal for MIMO according to an embodiment of the present invention.

FIG. 29 is an operation flowchart illustrating a method for receiving a broadcast signal for MIMO according to an embodiment of the present invention.

Referring to FIG. 29, the broadcast signal reception method for MIMO according to the embodiment of the present invention generates received signals based on signals which are received through multiple receiving antennas at step S2910.

Next, the broadcast signal reception method for MIMO according to the embodiment of the present invention estimates channels between the receiving antennas and transmitting antennas at step S2920.

Further, the broadcast signal reception method for MIMO according to the embodiment of the present invention restores a core layer (CL) signal corresponding to the received signals at step S2930.

Here, the core-layer signal may be restored based on Maximum-Ratio Combining (MRC) corresponding to the channels.

Next, the broadcast signal reception method for MIMO according to the embodiment of the present invention restores an enhanced-layer signal based on a cancellation process which corresponds to the core-layer signal and which is separately performed for the individual receiving antennas at step S2940.

Here, such a cancellation process may generate a first cancellation signal by subtracting a first core layer-channel component combination corresponding to channels that are related to a first receiving antenna, among the receiving antennas, from a first buffered signal corresponding to the first receiving antenna, and may generate a second cancellation signal by subtracting a second core layer-channel component combination corresponding to channels that are related to a second receiving antenna, among the receiving antennas, from a second buffered signal corresponding to the second receiving antenna. Here, the enhanced-layer signal may be restored using both the first cancellation signal and the second cancellation signal.

Here, the enhanced-layer signal may be restored using MIMO decoding corresponding to the first cancellation signal and the second cancellation signal.

The cancellation process may be performed based on Alamouti re-encoding corresponding to the core-layer signal, and the enhanced-layer signal may be restored using Alamouti decoding corresponding to the first cancellation signal and the second cancellation signal.

The Alamouti re-encoding may be performed after interleaving, and deinterleaving may be performed after the Alamouti decoding.

In accordance with the present invention, there is provided a broadcast signal transceiving technique in which multiple antenna schemes are combined with Layered Division Multiplexing.

Further, the present invention may efficiently combine multiple antenna schemes with Layered Division Multiplexing even when an Alamouti encoding technique, as well as a Transmit Diversity Code Filter Set (TDCFS) technique, is used.

Furthermore, the present invention may efficiently transceive broadcast signals without increasing the complexity of a reception apparatus even when there are three or more antennas, by utilizing a combination of a TDCFS scheme with an Alamouti encoding scheme when the Alamouti encoding scheme is applied as a MISO scheme.

In addition, the present invention may optimize the performance of a transceiver by suitably performing Layered Division Multiplexing/demultiplexing when spatial multiplexing gain is exploited for an enhanced layer.

As described above, in the method and apparatus for transceiving a broadcast signal according to the present invention, the configurations and schemes in the above-described embodiments are not limitedly applied, and some or all of the above embodiments can be selectively combined and configured such that various modifications are possible.

What is claimed is:

1. An apparatus for transmitting a broadcast signal, comprising:
   an enhanced layer bit-interleaved coded modulation (BICM) generator configured to generate a first enhanced-layer signal and a second enhanced-layer signal by dividing an enhanced-layer data stream into two different enhanced layer sub-streams and by performing Multiple-Input Multiple-Output (MIMO) precoding corresponding to the enhanced layer sub-streams;
   a first combiner configured to generate a first multiplexed signal corresponding to a first antenna by combining a first core-layer signal corresponding to a core-layer data stream with the first enhanced-layer signal at different power levels;
   a second combiner configured to generate a second multiplexed signal corresponding to a second antenna by combining a second core-layer signal corresponding to the core-layer data stream with the second enhanced-layer signal at different power levels; and
   one or more radio frequency signal generators configured to generate a first RF transmission signal and a second RF transmission signal, wherein the first RF transmission signal corresponds to the first multiplexed signal and is to be transmitted through the first antenna, and the second RF transmission signal corresponds to the second multiplexed signal and is to be transmitted through the second antenna, and
   wherein the first RF transmission signal and the second RF transmission signal are generated based on transmitting antenna processing corresponding to the first antenna and the second antenna.

2. The apparatus of claim 1, wherein the transmitting antenna processing is predistortion processing using a Transmit Diversity Code Filter Set (TDCFS).

3. The apparatus of claim 2, wherein the transmitting antenna processing is performed after a pilot pattern has been injected into a frequency-interleaved signal.

4. The apparatus of claim 1, wherein the transmitting antenna processing comprises Alamouti encoding for maintaining orthogonality between a signal corresponding to the first antenna and a signal corresponding to the second antenna.

5. The apparatus of claim 4, wherein the transmitting antenna processing is configured to inject pilot patterns into an Alamouti-encoded signal.

6. An apparatus for transmitting a broadcast signal, comprising:
   an enhanced layer bit-interleaved coded modulation (BICM) generator configured to generate a first enhanced-layer signal and a second enhanced-layer signal by dividing an enhanced-layer data stream into two different enhanced layer sub-streams and by performing Multiple-Input Multiple-Output (MIMO) precoding corresponding to the enhanced layer sub-streams;
   a first combiner configured to generate a first multiplexed signal corresponding to a first antenna by combining a first core-layer signal corresponding to a core-layer data stream with the first enhanced-layer signal at different power levels;
   a second combiner configured to generate a second multiplexed signal corresponding to a second antenna by combining a second core-layer signal corresponding to the core-layer data stream with the second enhanced-layer signal at different power levels; and
   one or more radio frequency signal generators configured to generate a first RF transmission signal and a second RF transmission signal, wherein the first RF transmission signal corresponds to the first multiplexed signal and is to be transmitted through the first antenna, and the second RF transmission signal corresponds to the second multiplexed signal and is to be transmitted through the second antenna, and
   wherein the first core-layer signal and the second core-layer signal are generated by dividing the core-layer data stream into two different core layer sub-streams and by performing MIMO precoding corresponding to the core layer sub-streams.

7. An apparatus for receiving a broadcast signal, comprising:
   one or more radio frequency receivers configured to generate received signals based on signals that are received through multiple receiving antennas;
   one or more channel estimators configured to estimate channels between the receiving antennas and transmitting antennas;
   a core layer bit-interleaved coded modulation (BICM) decoder configured to restore a core-layer signal corresponding to the received signals; and
   an enhanced layer decoder configured to restore an enhanced-layer signal based on a cancellation process, wherein the cancellation process corresponds to the core-layer signal and is separately performed for the individual receiving antennas, and wherein the cancellation process is configured to:

generate a first cancellation signal by subtracting a first core layer-channel component combination corresponding to channels that are related to a first receiving antenna, among the receiving antennas, from a first buffered signal corresponding to the first receiving antenna, generate a second cancellation signal by subtracting a second core layer-channel component combination corresponding to channels that are related to a second receiving antenna, among the receiving antennas, from a second buffered signal corresponding to the second receiving antenna, and restore the enhanced-layer signal using both the first cancellation signal and the second cancellation signal.

8. The apparatus of claim 7, wherein the enhanced-layer signal is restored using MIMO decoding corresponding to the first cancellation signal and the second cancellation signal.

9. The apparatus of claim 8, wherein the core-layer signal is restored based on Maximum-Ratio Combining (MRC) corresponding to the channels.

10. The apparatus of claim 8, wherein the cancellation process is performed based on Alamouti re-encoding corresponding to the core-layer signal, and is configured to restore the enhanced-layer signal using Alamouti decoding corresponding to the first cancellation signal and the second cancellation signal.

11. The apparatus of claim 10, wherein the Alamouti re-encoding is performed after interleaving, and deinterleaving is performed after the Alamouti decoding.

12. The apparatus of claim 8, wherein the cancellation process is performed based on MIMO precoding corresponding to the core-layer signal.

13. A method for receiving a broadcast signal, comprising:

generating received signals based on signals that are received through multiple receiving antennas;

estimating channels between the receiving antennas and transmitting antennas;

restoring a core-layer signal corresponding to the received signals; and restoring an enhanced-layer signal based on a cancellation process, wherein the cancellation process corresponds to the core-layer signal and is separately performed for the individual receiving antennas, wherein the cancellation process is configured to:

generate a first cancellation signal by subtracting a first core layer-channel component combination corresponding to channels that are related to a first receiving antenna, among the receiving antennas, from a first buffered signal corresponding to the first receiving antenna, generate a second cancellation signal by subtracting a second core layer-channel component combination corresponding to channels that are related to a second receiving antenna, among the receiving antennas, from a second buffered signal corresponding to the second receiving antenna, and restore the enhanced-layer signal using both the first cancellation signal and the second cancellation signal.

14. The method of claim 13, wherein the enhanced-layer signal is restored using MIMO decoding corresponding to the first cancellation signal and the second cancellation signal.

15. The method of claim 14, wherein the core-layer signal is restored based on Maximum-Ratio Combining (MRC) corresponding to the channels.

16. The method of claim 14, wherein the cancellation process is performed based on Alamouti re-encoding corresponding to the core-layer signal, and is configured to restore the enhanced-layer signal using Alamouti decoding corresponding to the first cancellation signal and the second cancellation signal.

17. The method of claim 16, wherein the Alamouti re-encoding is performed after interleaving, and deinterleaving is performed after the Alamouti decoding.

* * * * *